United States Patent
Barany et al.

(10) Patent No.: US 8,570,963 B2
(45) Date of Patent: Oct. 29, 2013

(54) COORDINATED MULTI-POINT (COMP) NETWORK AND PROTOCOL ARCHITECTURE

(75) Inventors: Peter A. Barany, San Diego, CA (US); Alexei Y. Gorokhov, San Diego, CA (US); Vikas Jain, San Diego, CA (US); Tao Luo, San Diego, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 336 days.

(21) Appl. No.: 12/911,674

(22) Filed: Oct. 25, 2010

(65) Prior Publication Data

US 2011/0268007 A1 Nov. 3, 2011

Related U.S. Application Data

(60) Provisional application No. 61/255,040, filed on Oct. 26, 2009.

(51) Int. Cl.
*H04W 4/00* (2009.01)
*H04W 72/04* (2009.01)

(52) U.S. Cl.
USPC .......................................... 370/329; 370/341

(58) Field of Classification Search
None
See application file for complete search history.

(56) References Cited

U.S. PATENT DOCUMENTS

| | | | |
|---|---|---|---|
| 2008/0207251 A1* | 8/2008 | Anderson | 455/522 |
| 2010/0120434 A1* | 5/2010 | Hasegawa | 455/436 |
| 2010/0202410 A1* | 8/2010 | Watanabe et al. | 370/331 |
| 2011/0218003 A1* | 9/2011 | Qiu | 455/507 |
| 2011/0222501 A1* | 9/2011 | Kim et al. | 370/329 |
| 2011/0281586 A1* | 11/2011 | Yu et al. | 455/436 |
| 2012/0002635 A1* | 1/2012 | Chung et al. | 370/329 |

OTHER PUBLICATIONS

"3rd Generation Partnership Project; Technical Specification Group Radio Access Network; Evolved Universal Terrestrial Radio Access Network (E-UTRAN); X2 application protocol (X2AP) (Release 9)", 3GPP Standard; 3GPP TS 36.423, 3rd Generation Partnership Project (3GPP), Mobile Competence Centre ; 650, Route Des Lucioles ; F-06921 Sophia-Antipolis Cedex ; France, No. V9.0.0, Sep. 1, 2009, pp. 1-102, XP050377738, paragraphs [0008]—[8.3.7.2].
3rd Generation Partnership Project; Technical Specification Group Radio Access Network; Further Advancements for E-UTRA Physical Layer Aspects(Release 9), 3GPP Draft; TR 36.814_130, 3rd Generation Partnership Project (3GPP), Mobile Competence Centre ; 650, Route Des Lucioles ; F-06921 Sophia-antipolis Cedex ; France, no. Shenzhen, China; 20090824, Jun. 1, 2009, pp. 1-46, XP050388254, [retrieved on Aug. 28, 2009].

(Continued)

*Primary Examiner* — Chi Pham
*Assistant Examiner* — Soon-Dong D Hyun

(57) ABSTRACT

Aspects of the present disclosure relate generally to wireless communication systems, and more particularly to a coordinated multi-point network and protocol architecture. One aspect discloses a method of wireless communication and includes receiving a measurement report from a user equipment (UE). Coordinated multi point (CoMP) control messages are transmitted from a first eNodeB to a second eNodeB at a medium access control (MAC) layer in response to the received measurement report.

24 Claims, 28 Drawing Sheets

(56) References Cited

OTHER PUBLICATIONS

Huawei: "RAN2 considerations for coordinated multipoint transmission and reception", 3GPP Draft; R2-093107 RAN2 Considerations for Comp, 3rd Generation Partnership Project (3GPP), Mobile Competence Centre; 650, Route Des Lucioles; F-06921 Sophia-Antipolis Cedex; France, no. San Francisco, USA; 20090428, Apr. 28, 2009, XP050340849, [retrieved on Apr. 28, 2009].

International Search Report and Written Opinion—PCT/US2010/054162—ISA/EPO—Feb. 7, 2011.

Jungnickel .V, et al., "Implementation concepts for distributed cooperative transmission", Signals, Systems and Computers, 2008 42nd Asilomar Conference on, IEEE, Piscataway, NJ, USA, Oct. 26, 2008, pp. 1035-1039, XP031475445, ISBN: 978-1-4244-2940-0.

Nokia Siemens Networks et al: "Crossing of X2 Setup Request message", 3GPP Draft; R3-091410, 3rd Generation Partnership Project (3GPP), Mobile Competence Centre; 650, Route Des Lucioles; F-06921 Sophia-Antipolis Cedex; France, no. San Francisco, USA; 20090509, May 9, 2009, XP050341737, [retrieved on May 9, 2009].

Qualcomm Europe: "Coordinated Multi-Point downlink transmission i n LTE-Advanced" 3GPP Draft; R1-084400 Comp, 3rd Generation Partnership Project (3GPP), Mobile Competence Centre; 650, Route Des Lucioles; F-06921 Sophia-Antipolis Cedex; France, no. Prague, Czech Republic; Nov. 5, 2008, XP050317663.

3rd Generation Partnership Project, Technical Specification Group Radio Access Network: "Evolved Universal Terrestrial Radio Access (E-UTRA) Medium Access Control (MAC) protocol Specification (Release 8)" 3GPP TS 36.321 V8.0.0 (Dec. 2007), Dec. 1, 2007 XP002525660 p. 17, paragraph 5.4.5 p. 20, paragraph 6.1.3.1.

Alcatel-Lucent: "Consideration of Backhaul Technology Evolution in Support of CoMP", R1-092311, 3GPP TSG-RAN WG1 #57bis, Los Angeles, CA, USA, Jun. 29-Jul. 3, 2009.

CATT: "The Procedure of the Downlink CoMP", 3GPP TSG RAN WG2 Meeting #67, R2-094331, Shenzhen, China, Aug. 24-28, 2009.

Fujitsu, UL CoMP HARQ Processing, 3GPP TSG RAN WG2 Meeting #67 R2-094588, Aug. 24, 2009.

Taiwan Search Report—TW099136559—TIPO—Jul. 4, 2013.

* cited by examiner

| Type of Control Frame | Value |
|---|---|
| CHANNEL STATE INFORMATION | 000 0000 |
| SCHEDULING INFORMATION | 000 0001 |
| RESOURCE STATUS REQUEST | 000 0010 |
| RESOURCE STATUS INDICATION | 000 0011 |
| BEAMFORMING VECTOR INFORMATION | 000 0100 |
| RESERVED | 000 0101 – 111 1111 |

• Successful operation

• Unsuccessful operation

• Successful operation

• Unsuccessful operation

• Successful operation

• Successful operation

• Successful operation

• Successful operation

• Unsuccessful operation
  • None

__US 8,570,963 B2__

COORDINATED MULTI-POINT (COMP) NETWORK AND PROTOCOL ARCHITECTURE

CROSS-REFERENCE TO RELATED APPLICATION

This application claims the benefit of U.S. Provisional Patent Application No. 61/255,040, entitled "Downlink coordinated multi-point network and protocol architecture," filed on Oct. 26, 2009, the disclosure of which is expressly incorporated herein by reference in its entirety.

BACKGROUND

1. Field

Aspects of the present disclosure relate generally to wireless communication systems, and more particularly to a coordinated multi-point network and protocol architecture.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output (SISO), multiple-input single-output (MISO) or a multiple-input multiple-output (MIMO) system.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels, where $N_S \leq \min\{N_T, N_R\}$. Each of the NS independent channels corresponds to a dimension. The MIMO system can provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

SUMMARY

In one embodiment, a method of wireless communication is disclosed. The method includes receiving a measurement report from a user equipment (UE). The method also includes transmitting a coordinated multi point (CoMP) control message from a first evolved nodeB (eNodeB) to a second eNodeB at a medium access control (MAC) layer in response to the received measurement report.

In one embodiment, an apparatus for wireless communication is disclosed. The apparatus includes means for receiving a measurement report from a UE and means for transmitting CoMP control messages from a first eNodeB to a second eNodeB in response to the received measurement report. The CoMP control messages can be transmitted at a MAC layer of the first eNodeB and in connection with scheduling decisions of the first eNodeB.

In another embodiment, a computer program product for wireless communications in a wireless network is disclosed. The computer-readable medium has program code recorded thereon which, when executed by one or more processors, cause the one or more processors to perform operations of receiving a measurement report transmitted by a UE. The program code also causes the one or more processors to generate, in response to the received measurement report, CoMP control messages which are transmitted from a first eNodeB to a second eNodeB at a MAC layer.

An apparatus for wireless communication having a memory and at least one processor coupled to the memory is disclosed in a further embodiment. The one or more processors are configured to receive a measurement report from a UE and to transmit CoMP control messages from a first eNodeB to a second eNodeB in response to the received measurement report The CoMP control messages can be transmitted at a MAC layer of the first eNodeB and in connection with scheduling decisions of the first eNodeB.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

DETAILED DESCRIPTION

The detailed description set forth below, in connection with the appended drawings, is intended as a description of various configurations and is not intended to represent the only configuration in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such conceptions.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Figure 1:
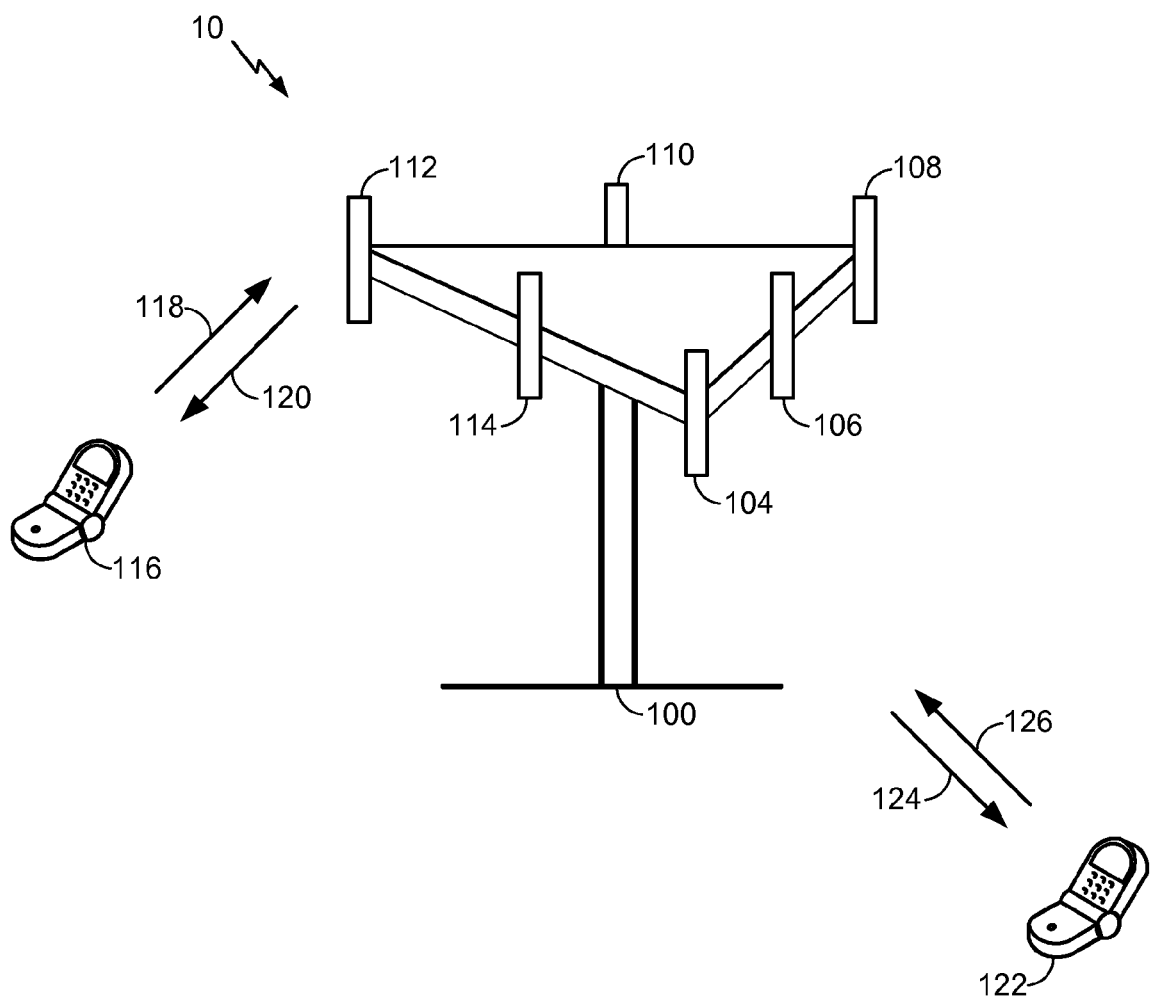
FIG. 1 illustrates an example multiple access wireless communication system according to one embodiment.

Referring to FIG. 1, a multiple access wireless communication system 10 according to one embodiment of the disclosure is illustrated. An access point 100 (AP) (also referred to as an evolved Node B (eNodeB, eNB)) includes multiple antenna groups, one group including antennas 104 and 106, another group including antennas 108 and 110, and an additional group including antennas 112 and 114. Each group of antennas and/or the area in which they are designed to communicate may be referred to as a cell. Although only one eNodeB is shown, communication system 10 may include multiple interconnected eNodeBs 100 which may be may exchange control information and data and may cooperate in the transmission of data to wireless devices.

A user equipment (UE) 116, also referred to an Access Terminal (AT) is shown in communication with antennas 112 and 114, where antennas 112 and 114 transmit information to the UE 116 over a downlink 120 and receive information from the UE 116 over an uplink 118. The UE 122 is in communication with antennas 106 and 108, where antennas 106 and 108 transmit information to the UE 122 over a downlink 126 and receive information from the UE 122 over an uplink 124. In a FDD system, communication links 118, 120, 124 and 126 may use different frequency for communication. For example, the downlink 120 may use a different frequency then that used by the uplink 118. Although only one antenna is shown for each UE, one skilled in the art would understand that more than one antenna for each UE (116 and/or 122) may be used.

In one aspect, the communication system 10 can be a Long Term Evolution (LTE) system. LTE is a next-generation of the Universal Mobile Telecommunications System (UMTS), a worldwide standard for wireless communications. LTE systems may support coordinated multi point (CoMP). This feature can provide an interference mitigation technique for improving overall communication performance. With CoMP, multiple eNodeBs 100 collaborate to transmit data on the downlink and/or to receive data on the uplink. In certain types of CoMP, the eNodeBs 100 can transmit the same information in parallel to one or more UEs thereby improving overall communication performance.

Figure 2:
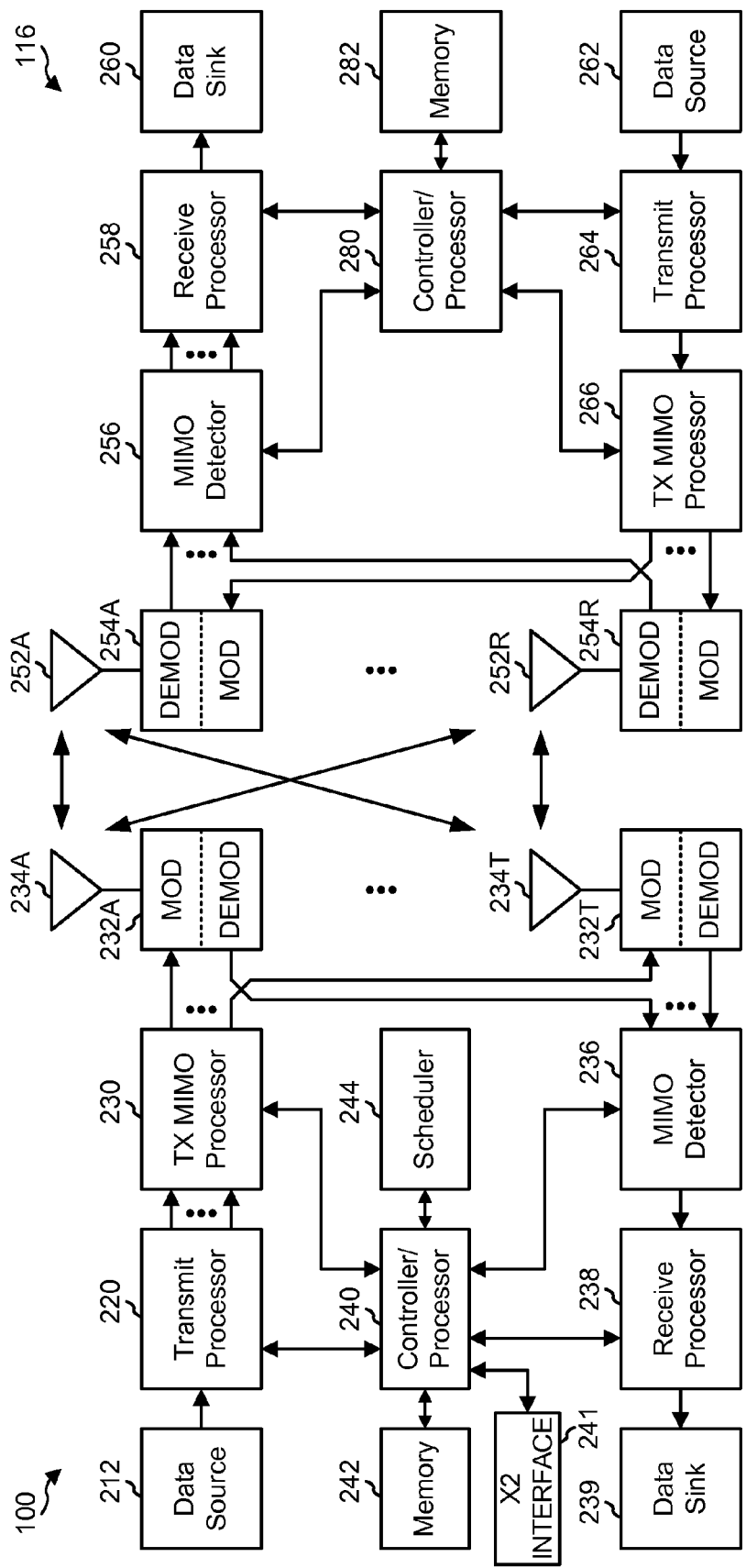
FIG. 2 illustrates an example block diagram of a transmitter and a receiver in a wireless communication system.

FIG. 2 shows a block diagram of a design of a base station/eNB 100 and a UE 116, which may be one of the eNodeBs and one of the UEs depicted in FIG. 1. As shown, the base station 100 may be equipped with antennas 234a through 234t, and the UE 116 may be equipped with antennas 252a through 252r.

At the base station 100, a transmit processor 220 may receive data from a data source 212 and control information from a controller/processor 240. The control information may be transmitted on a physical downlink control channel (PDCCH). The data may be transmitted on a physical downlink shared channel (PDSCH), etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal.

A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 116, the antennas 252a through 252r receive the downlink signals from the base station 100 and can provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 116 to a data sink 260, and provide decoded control information to a controller/processor 280.

On the uplink, at the UE 116, a transmit processor 264 may receive and process data (e.g., for the PUSCH) from a data source 262 and control information (e.g., for the PUCCH) from the controller/processor 280. The processor 264 may also generate reference symbols for a reference signal. The symbols from the transmit processor 264 may be precoded by a TX MIMO processor 266 if applicable, further processed by the demodulators 254a through 254r (e.g., for SC-FDM, etc.), and transmitted to the base station 100. At the base station 100, the uplink signals from the UE 116 are received by antennas 234, processed by the modulators 232, detected by a MIMO detector 236 if applicable, and further processed by a receive processor 238 to obtain decoded data and control information sent by the UE 116. The processor 238 may provide the decoded data to a data sink 239 and the decoded control information to the controller/processor 240.

The controllers/processors 240 and 280 may direct the operation of the base station 100 and the UE 116, respectively. The processor 240 and/or other processors and modules at the base station 100 may perform or direct the execution of various processes for the techniques described herein. The processor 280 and/or other processors and modules at the UE 116 may also perform or direct the execution of the functional blocks illustrated in FIGS. 4-13, and/or other processes for the techniques described herein. The memories 242 and 282 may store data and program codes for the base station 100 and the UE 116, respectively. A scheduler 244 may schedule UEs for data transmission on the downlink and/or uplink.

Base station 100 may also participate in a coordinated multi-point transmission to the UE 116 with other base stations. In one aspect, the controller 240 directs a downlink transmission which includes a reference signal (RS). The RS can be a cell-specific reference signal (CRS) transmitted on downlink resources determined according to a cell identifier of the base station 100, or it can be some other reference signal. The downlink transmission from the base station 100 is received at UE 116 which may also receive downlink transmissions from one or more neighboring base stations.

The receive processor 258 at UE 116 can detect symbols for the reference signal (e.g., the CRS) in the downlink transmissions and, based on the reference signals, the controller/processor 280 can determine channel information for each base station, including the base station 100. In some aspects, the UE controller/processor 280 determines channel direction information (CDI) and channel magnitude information (CMI) for the received signals, which can be wide-band or can be associated with specific sub-bands of the downlink transmission. The channel information may also include a measure of residual interference which may be normalized with respect to the signal from a serving base station (e.g., the base station 100).

The controller/processor 280 can direct the UE 116 to transmit a measurement report including the channel state information, the residual interference measurements, etc. for each base station from which a downlink signal was received. In one aspect, the measurement report includes channel state information for each base station in a CoMP Cooperating Set (CCS) of the UE 116. The UE 116 may transmit the measurement report on the PUSCH either periodically, or when triggered by the base station 100.

In response to receiving the measurement report, the base station 100 may generate one or more CoMP control messages. The CoMP control messages may include information obtained from the measurement report as well as information relating to a type of the CoMP transmission and/or data to be transmitted. For example, the CoMP control messages may relate to a joint transmission (JT) mode, a coordinated scheduling/coordinated beamforming mode (CS/CB), etc. The base station 100 can send the CoMP control messages to other base stations, for example, base stations in the CCS of the UE 116, over the X2 interface 241.

In one aspect, the CoMP control messages are generated at a medium access control (MAC) layer of the base station 100. For example, the CoMP control messages may be generated in connection with scheduling decisions of the scheduler 244 and may include scheduling information for use by other base stations, in addition to channel state information, beamforming information, joint transmission information, etc. The MAC layer in the serving eNodeB 100 can make a scheduling decision based upon UE measurement reports. The serving eNodeB MAC layer is also the entity that processes the UE's HARQ feedback (e.g., ACK/NACK) for the data transmitted on the downlink from the serving eNodeB (and/or CCS eNodeB(s)). Therefore, the serving eNodeB MAC layer may be responsible for scheduling MAC retransmissions as well.

Figure 3:
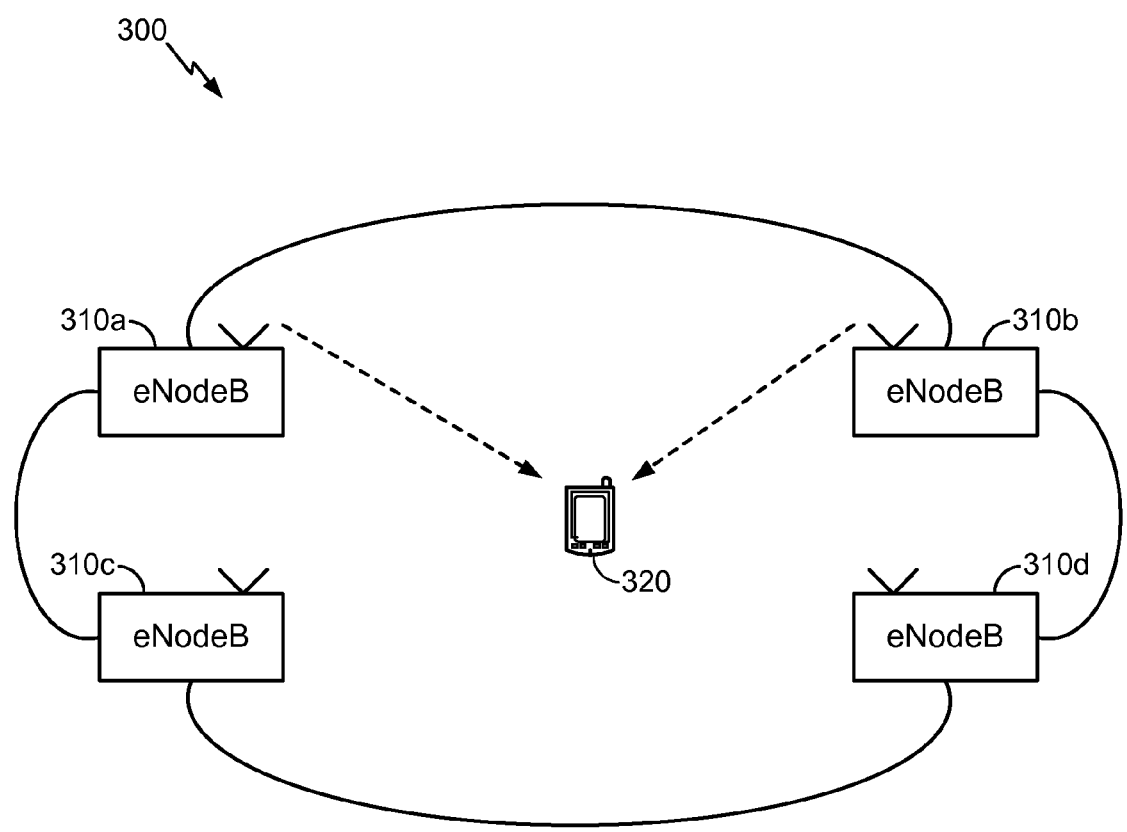
FIG. 3 shows aspects of a coordinated multi-point (CoMP) transmission in which multiple eNodeBs transmit to a user equipment.

FIG. 3 illustrates an example of a coordinated multi point (CoMP) system 300 with multiple eNodeBs transmitting to a user equipment 320. The multiple eNodeBs 310a, 310b, 310c, 310d can be as described in connection with FIGS. 1-2, and are capable of communicating with each other as indicated by the connecting lines. Communication between the multiple eNodeBs 310 can be over an X2 interface 241, or a backhaul connection. In one aspect, each eNodeB 310 can communicate with any of the other eNodeBs 310. For example, the eNodeB 310a is capable of communicating with any of the eNodeBs 310b, 310c, and 310d. One skilled in the art would understand that the quantities of eNodeBs and UE shown are for illustration only and that other quantities are possible without limiting the scope or spirit of the present disclosure.

CoMP transmission may be used to improve the received Signal-to-Interference plus Noise Ratio (SINR), and thus, data rate, through enhanced spatial multiplexing or interference reduction through coordinated action by multiple eNodeBs. However, such coordination typically requires tight synchronization and message exchanges among the coordinating eNodeBs.

The eNodeBs 310 of the CoMP system 300 may be organized into a variety of sets. For example, a CoMP Cooperating Set (CCS) is a set of geographically separated points directly or indirectly participating in PDSCH (physical downlink shared channel) transmission to the UE 320. The CCS may or may not be transparent to the UE. As another example, CoMP Transmission Points (CTPs) are a set of points which are actively transmitting the PDSCH to a UE. In general, CTPs are a subset of CCS (i.e., not all members of the CCS may be actively transmitting). As another example, a CoMP Measurement Set (CMS) is a set of cells for which channel state or statistical information related is reported by the UE 320. In one example, the CMS may be the same as the CCS. In another example, the CMS may be determined according to the UE measurement reports and some cells may be dropped based on the measurements. In another example, a RRM Measurement Set (RMS), to support Radio Resource Management (RRM) measurements may be used for long-term channel state information.

Feedback techniques for the support of downlink CoMP may be characterized into three categories: explicit feedback, implicit feedback and UE transmission of Sounding Reference Signals (SRS). For explicit feedback, information as observed by the receiver is sent back to the transmitter without assuming any transmitter or receiver processing. In implicit feedback, information is sent back to the transmitter that use hypotheses of different transmission and/or reception processing (e.g., channel quality indication (CQI), precoder matrix indication (PMI), and rank indication (RI)). User equipment transmissions of Sounding Reference Signals (SRS) may be used for Channel State Information (CSI) estimation at an eNodeB exploiting channel reciprocity.

In one example, a cyclic prefix may be added to a transmission waveform. A cyclic prefix is a redundant copy of an ending portion of a transmission waveform which is placed at a beginning portion of a transmission waveform to protect against multipath distortion at the receiver. In another aspect, the addition of a cyclic prefix to a transmission waveform may not always protect the useful portion of a received signal. The useful portion is that part of the received signal which contains the desired information bits. For example, if the useful portion of a received signal lies beyond the span of the cyclic prefix, significant performance degradation may result. Thus, the useful portions of a plurality of received signals must be aligned in time within a cyclic prefix window to obtain full performance benefit from CoMP.

CoMP transmissions in the system 300 may be divided into three categories: coordinated scheduling/beamforming (CS/CB), dynamic Cell selection (DCS), and joint transmission (JT). In coordinated scheduling/beamforming, data is only available at the serving cell but user scheduling/beamforming decisions are made with coordination among cells corresponding to the CoMP Cooperating Set (CCS). Dynamic cell selection and joint transmission are both a type of joint processing. In dynamic cell selection (DCS), the PDSCH transmission is from one point at a time within a CoMP cooperating set (CCS). In joint transmission, the PDSCH transmission is from multiple points (part of a n entire CoMP cooperating set) at a time. More particularly, data to a single UE is simultaneously transmitted from multiple transmission points.

In one embodiment, to obtain the potential performance benefits of downlink CoMP in a system 300, eNBs 310 employ an efficient network and protocol architecture to facilitate exchange of a large amount of real-time information. For example, this information exchange is particularly applicable to downlink CoMP joint processing (JP) schemes such as joint transmission and dynamic cell selection. This information is also applicable to the downlink CoMP scheme known as Coordinated Scheduling/Beamforming (CS/CB). In one aspect, JT involves simultaneous PDSCH transmission from multiple points at a time, where the multiple points are part of or the entire CoMP Cooperating Set (CCS). JT may be used, for example, to improve the received signal quality and/or to cancel active interference to other UEs. In another aspect, DCS involves PDSCH transmission from one point at a time within a CoMP Cooperating Set (CCS). In another aspect, CS/CB involves user scheduling or beamforming decisions coordinated among eNodeBs of the CCS.

In one embodiment, eNodeBs 310 may implement a protocol referred to herein as a downlink shared channel (DL-SCH) Frame Protocol (FP). This protocol carries both control information and data/control information, which are defined as two separate types of Frame Type in the header of the actual downlink CoMP DL-SCH messages. As described herein, one of the advantages of this protocol is that the Medium Access Control (MAC) entity in the eNodeBs 310 that receive data/control information does not need to maintain any state information. For example, if the MAC protocol data units (PDUs) need retransmission due to the receipt of a negative acknowledgement in a hybrid automatic retransmission request (HARQ) transmission by the serving eNodeB (e.g., 310a), then the other eNodeBs 310b-310d will receive another downlink CoMP DL-SCH FP message which contains MAC PDUs for the HARQ retransmission.

Figure 4:
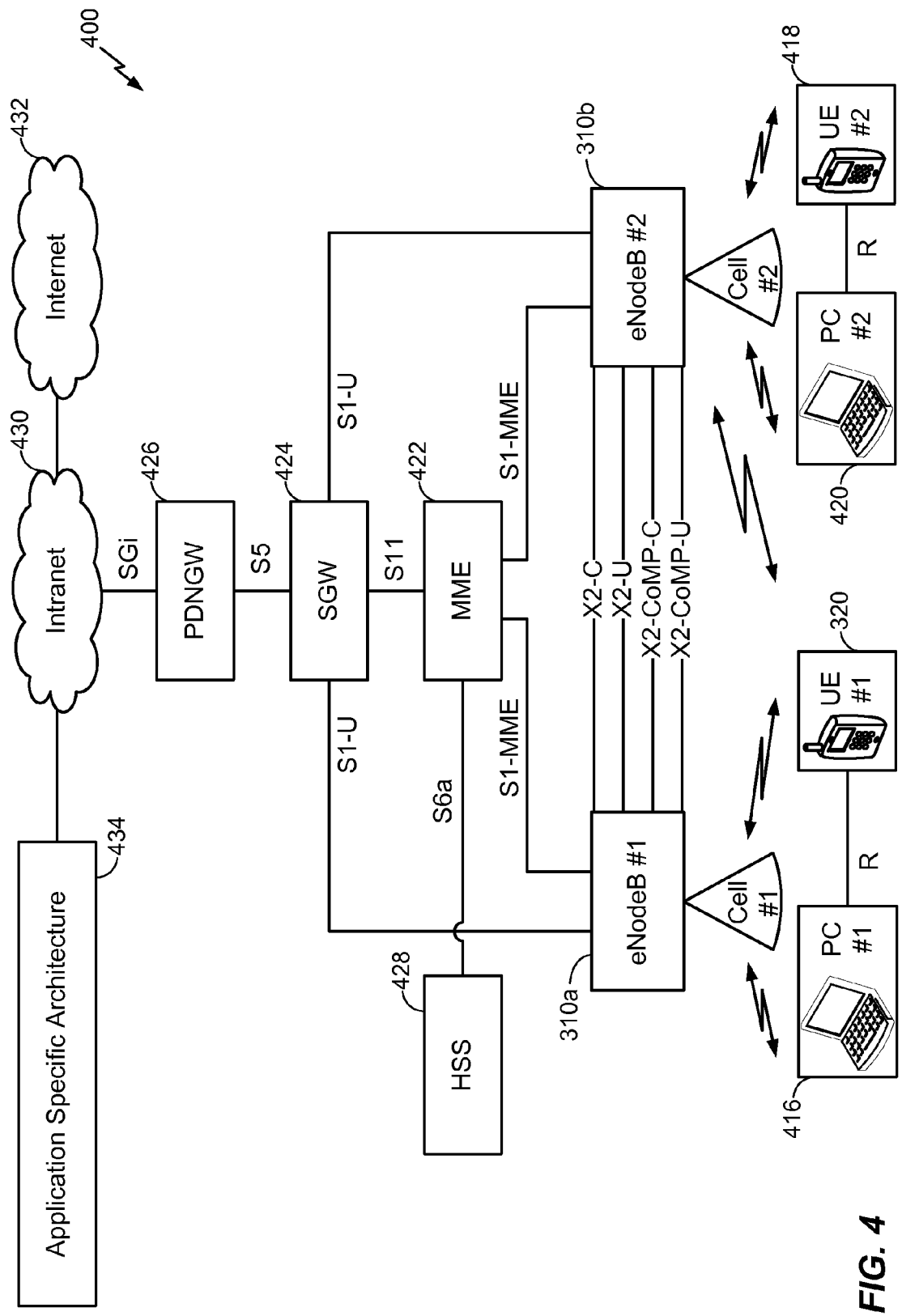
FIG. 4 illustrates an exemplary CoMP network architecture.

FIG. 4 illustrates an example LTE downlink CoMP network architecture 400 which may operate in the manner described in connection with FIG. 3. The example is illustrated for downlink CoMP transmission, however those skilled in the art will appreciate that uplink CoMP transmission may be implemented as well. Shown in this figure are two eNodeBs, 310a and 310b, which handle bidirectional wireless connections with UEs 320 and 418 over the E-UTRA interface (i.e., the LTE air interface). Optionally, the eNodeBs 310a and 310b may also handle connections to personal computers 416 and 420. The eNodeBs 310a and 310b are interconnected over an X2 interface for both user plane and control plane exchanges between eNodeBs. Optionally, in an alternate embodiment, the eNodeBs 410 and 412 may exchange information via a S1 interface via the MME 422, or any other interface known to those skilled in the art. For purpose of illustration only, the following examples are described with respect to an X2 interface.

As illustrated, eNodeBs 310 are connected to a Mobile Management Entity (MME) 422 over a S1-MME interface and to a Serving Gateway (SGW) 424 over an S1-U interface. The MME 422 and SGW 424 are connected by a S11 interface and the MME 422 is connected to a Home Subscriber Server (HSS) 428 over an S6a interface. The SGW 424 in turn is connected to a Packet Data Network Gateway (PDNGW) 426 over an S5 interface, and the PDNGW 426 is connected to an Intranet 430, Internet 432, or other application specific network architectures 434 over a SGi interface.

In one aspect, the SGW or PDNGW serves as a mobility anchor for data bearers when the UE moves between different eNodeBs (where the SGW may change due to inter-SGW handover). In another aspect, the MME serves as a control entity for managing the signaling between the UE and the core network (CN) (where the MME may change due to inter-MME handover). The SGW interfaces with the packet data network gateway (PDNGW), which functions as an LTE portal to the global Internet, for example. The PDNGW also allocates IP addresses for the UE and enforces quality of service (QoS) based on policy rules.

Figure 5:
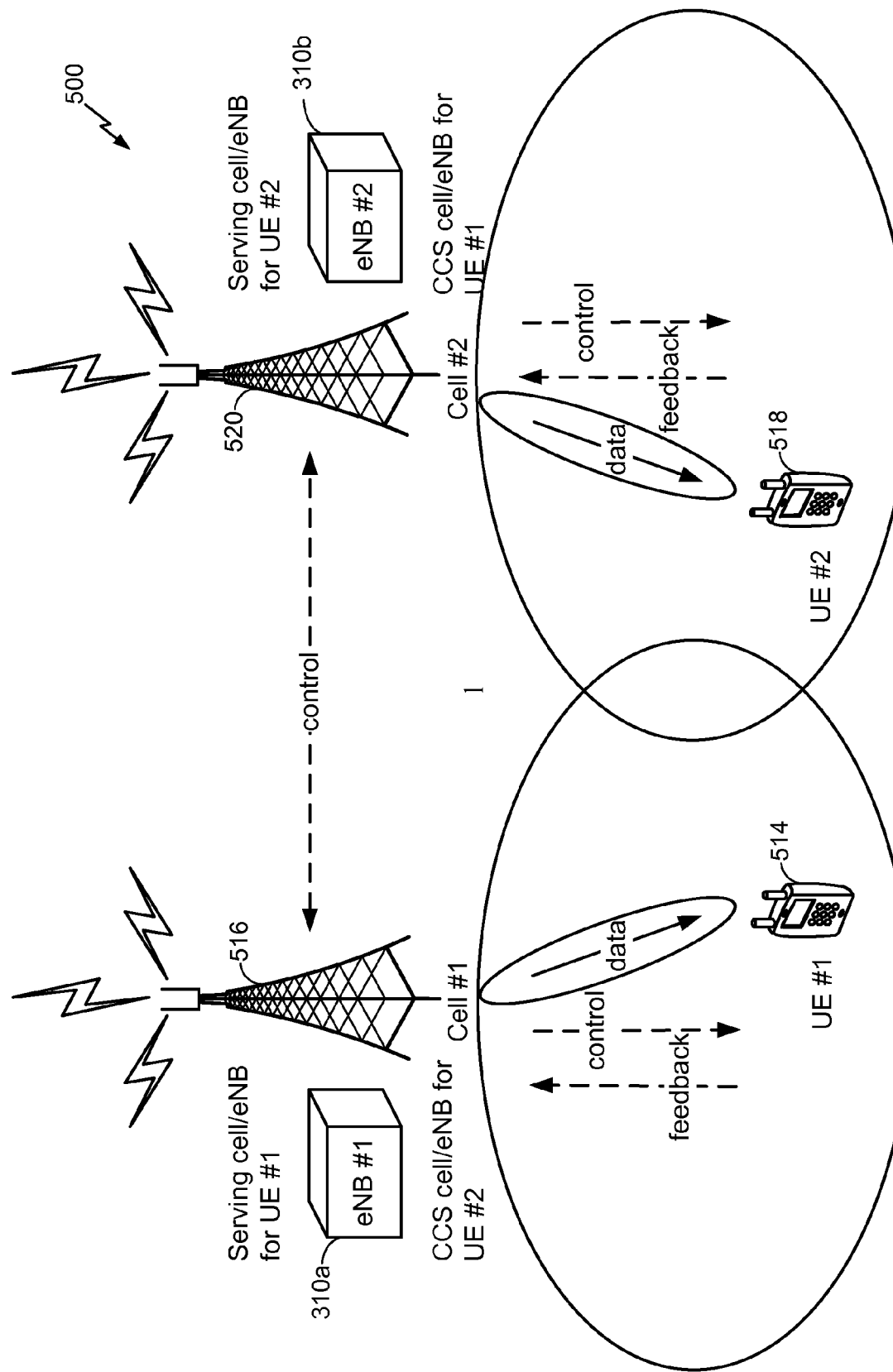
FIG. 5 illustrates an exemplary CoMP transmission with coordinated scheduling/beamforming.

FIG. 5 illustrates an example downlink CoMP transmission scenario with coordinated scheduling/beamforming (CS/CB). In the example system 500, transmission is provided by eNodeBs 310a and 310b to UEs 514 and 518 respectively. In this example, only control information is transmitted between the two eNodeBs 310. In particular, scheduling data for the UEs 514 and 518 is sent back and forth between the eNodeBs 310 in order to determine the appropriate beam formation. For example, this allows for narrow beam configuration to reduce or minimize interference.

Figure 6:
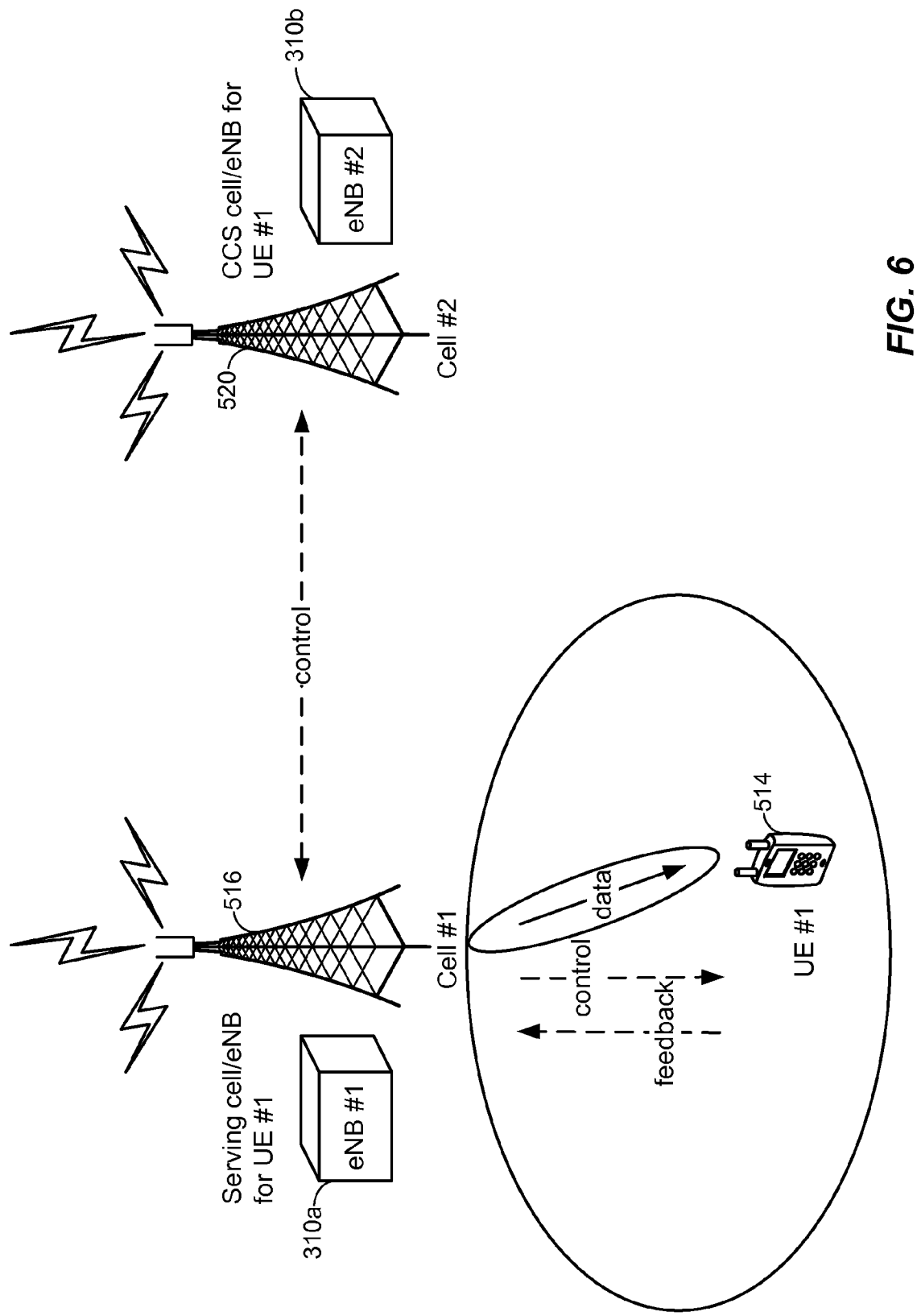
FIG. 6 illustrates an exemplary CoMP transmission with dynamic cell selection.
Figure 7:
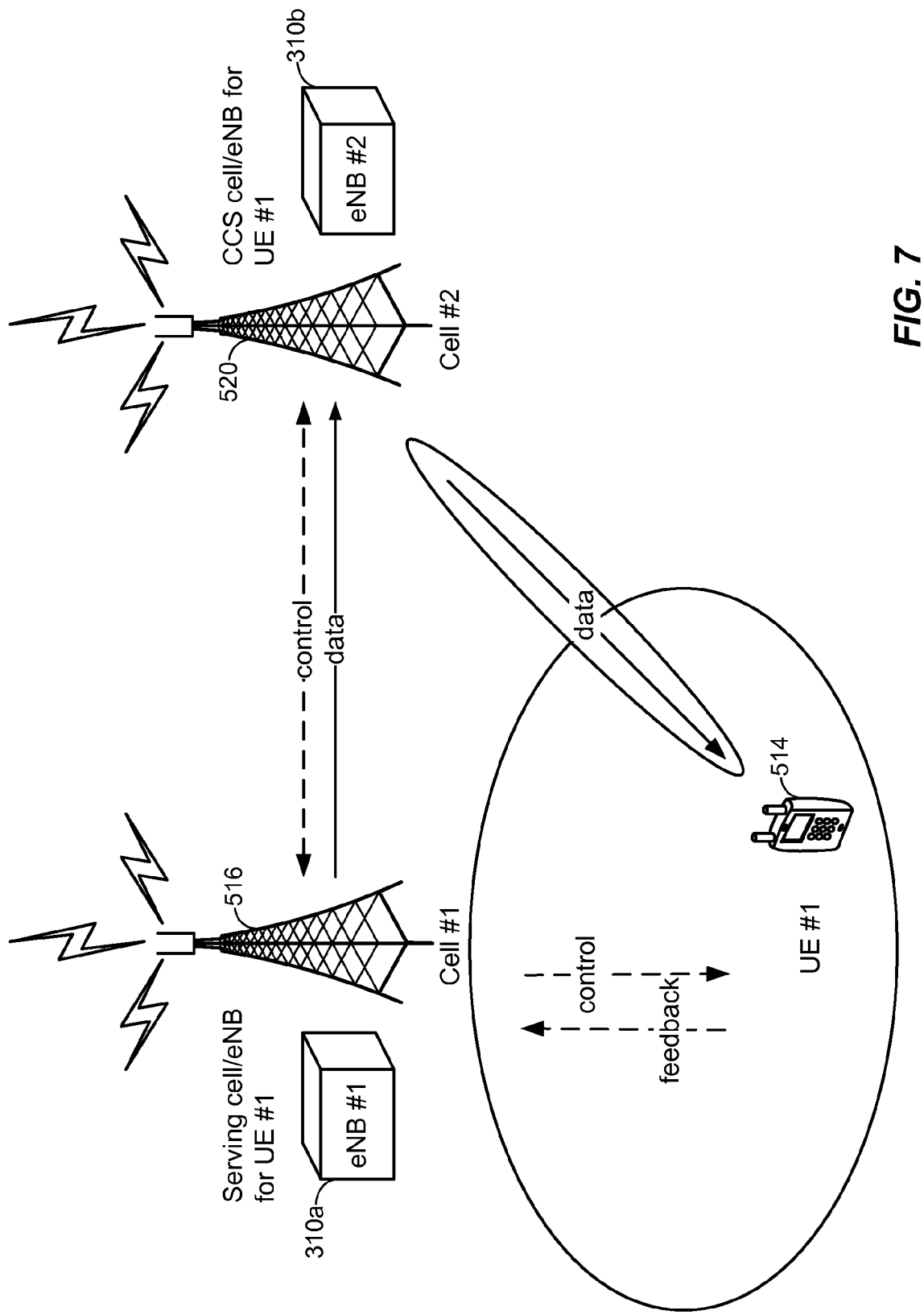
FIG. 7 illustrates a further exemplary CoMP transmission with dynamic cell selection.

FIGS. 6 and 7 illustrates examples of downlink CoMP transmission with dynamic cell selection (DCS). In dynamic cell selection, control information is exchanged between eNodeB 310a and eNodeB 310b to determine which cell is better suited to send data to the UE. In FIG. 6, the eNodeB 310a is transmitting to the UE 514 via a serving cell tower 516, because it was determined the serving cell tower 516 can obtain the best directed beam. In FIG. 7, the eNodeB 310b is providing transmission to the UE 514 via the cell tower 520, rather than utilizing the eNodeB 310a and the serving cell tower 516. In FIG. 7, both control and data messaging occurs between the eNodeBs 310, whereas in FIG. 6 only control messaging occurs between the eNodeBs.

Figure 8:
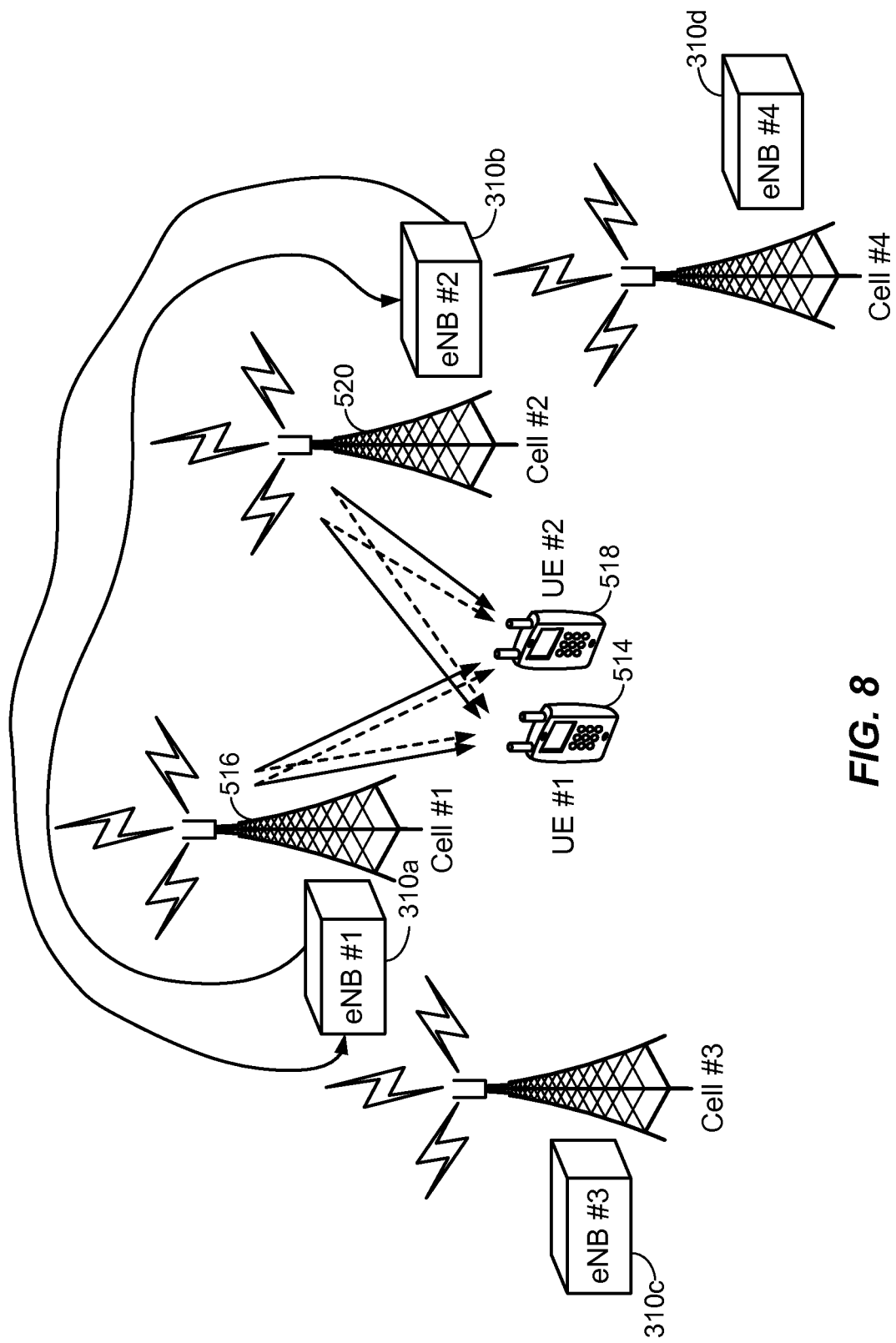
FIG. 8 illustrates an exemplary CoMP transmission with joint transmission.

In FIG. 8, an example of a downlink CoMP transmission scenario with joint transmission (JT) is illustrated. Joint transmission refers to multiple downlink physical layer transmissions at a time from multiple transmission points to one or several UEs. In this example scenario, joint transmission is provided by two eNodeBs 310a, 310b to two UEs 514 and 518. The joint transmission may provide improved transmission performance by enhanced spatial multiplexing or interference reduction through coordinated action by multiple eNodeBs. The other illustrated eNodeBs 310c and 310d are not involved in the transmissions.

Figure 9:
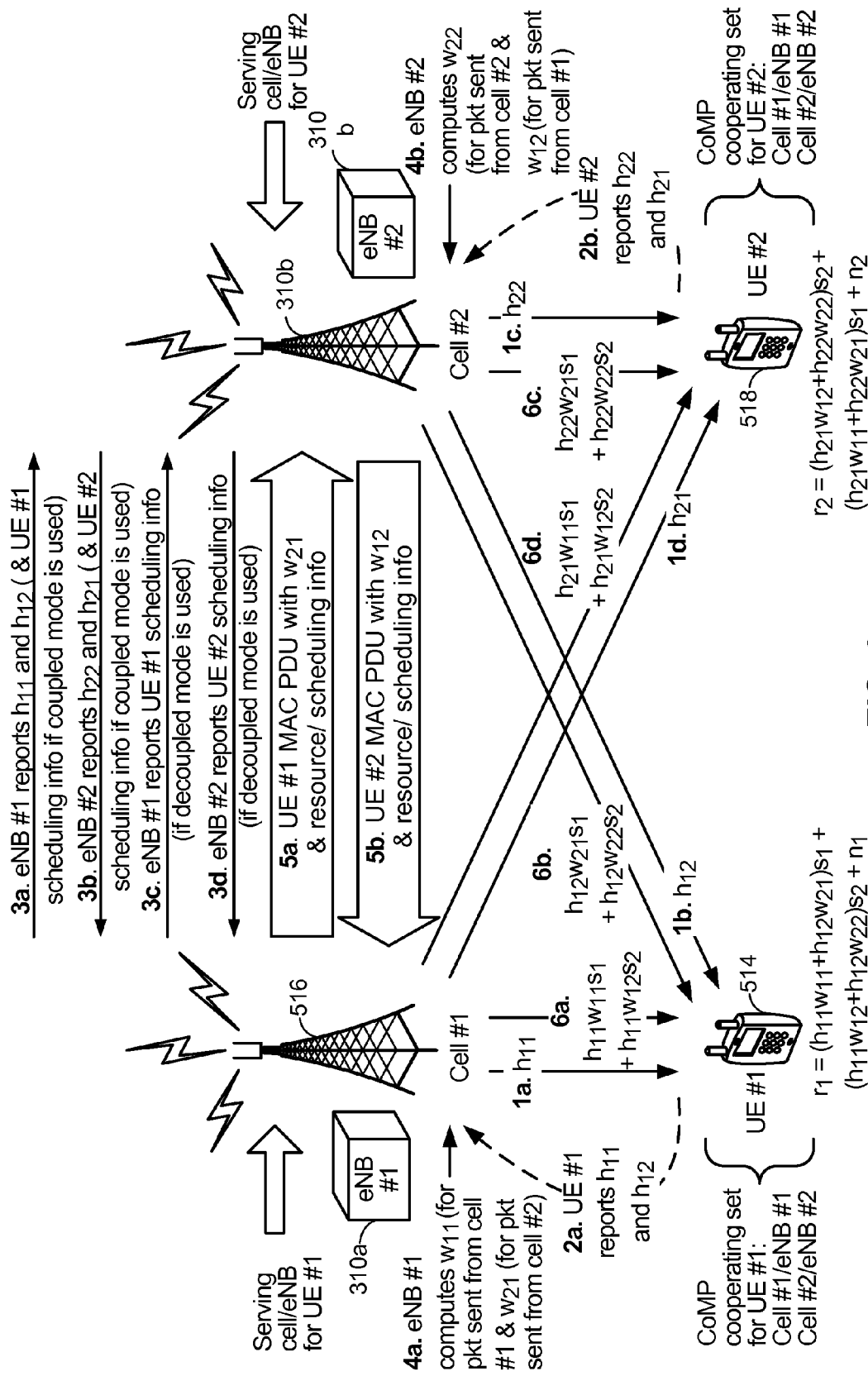
FIG. 9 illustrates a CoMP transmission procedure with joint transmission (JT).

FIG. 9 illustrates another example of a downlink CoMP transmission procedure with joint transmission. In this example illustration, there are two eNodeBs, 310a and 310b and two UEs 514 and 518. In one example, the channel reports from the UEs 514 and 518 include composite propagation channel transfer functions between the eNodeBs 310a and 310b and the UEs 514 and 518 may be represented by a complex transmission or CSI matrix $$H=[h_{11}h_{21}; h_{12}h_{22}],$$

where $h_{11}$=transfer function between the first eNodeB 310a and the first UE 514,
$h_{21}$=transfer function between the first eNodeB 310a and the second UE 514,
$h_{12}$=transfer function between the second eNodeB 310b and the first UE 514, and
$h_{22}$=transfer function between the second eNodeB 310b and the second UE 518.

The downlink CoMP transmission procedure begins at steps 1a-d with initial reference signal transmissions (which may or may not include data transmissions) from both eNodeBs 310a, 310b to both UEs 514, 518, where each initial reference signal transmission received can be affected by one of the four elements of the complex transmission matrix H. From the initial reference signal transmission received signals, at step 2a, the first UE 514 may estimate and report back to the first eNodeB 310a the transfer functions h11 and h12. Similarly, at step 2b the second UE 518 may estimate and report back to the second eNodeB 310b the transfer functions h21 and h22. Next, at steps 3a-d, the eNodeBs 310a, 310b exchange their individual reported transfer functions with each other so that each eNodeB may construct an estimated complex transmission matrix H'. Optionally, if a coupled mode of operation is used, then UE scheduling information may also be included a single message exchanged between the eNodeBs 310a and 310b.

The UE scheduling information includes subframe number and physical resource blocks to be allocated for a UE data transmission. At step 4a, the eNodeB 310a computes weight (i.e., precoding) w11 and weight w21 for the UE 514. Similarly, at step 4b, the eNodeB 310b computes weight (i.e., precoding) w12 and weight w22 for UE 518. Next, at step 5a, the eNodeB 310a reports weight w21 via the UE 514 MAC PDU and resource/scheduling information to the eNodeB 310b. Similarly, at step 5b, the eNodeB 310b reports weight w12 via UE 518 MAC PDU and resource/scheduling information to the eNodeB 310a. The UE scheduling information is the same as the UE scheduling information communicated between eNodeBs in a previous block, although an efficient mapping/compression scheme may be used to convey this information.

Next, at steps 6a-d, given desired symbols s1 and s2 for UE 514 and UE 518, respectively, the eNodeB 310a transmits a weighted transmit signal w11s1+w12s2 and the eNodeB 310b transmits a weighted signal w21s1+w22s2. After transmission through the propagation channel, the received JT waveform at each UE is given by:

$$r_1=(h_{11}w_{11}+h_{12}w_{21})s_1+(h_{11}w_{12}+h_{12}w_{22})s_2+n_1; \quad (1)$$

$$r_2=(h_{21}w_{11}+h_{22}w_{21})s_1+(h_{21}w_{12}-h_{22}w_{22})s_2+n_2 \quad (2)$$

where for these equations, $r_1$=received JT waveform at UE 514,
$r_2$=received JT waveform at UE 518,
$n_1$=additive noise at UE 514, and
$n_2$=additive noise at UE 518.

In the case of CS/CB CoMP or DCS CoMP in which the serving eNodeB is selected for data transmission, the MAC PDUs are not exchanged. In other words, no data messaging occurs between the eNodeBs 310a and 310b.

Assuming that the transmission delay due to the X2 interface is small relative to the channel delay spread and the time required for the eNodeBs to exchange control information and data, then, ideally, for r1, the term (h11w12+h12w22)s2 will approach zero. Likewise, for r2, the term (h21w11+h22w21)s1 will approach zero.

Figure 10A:
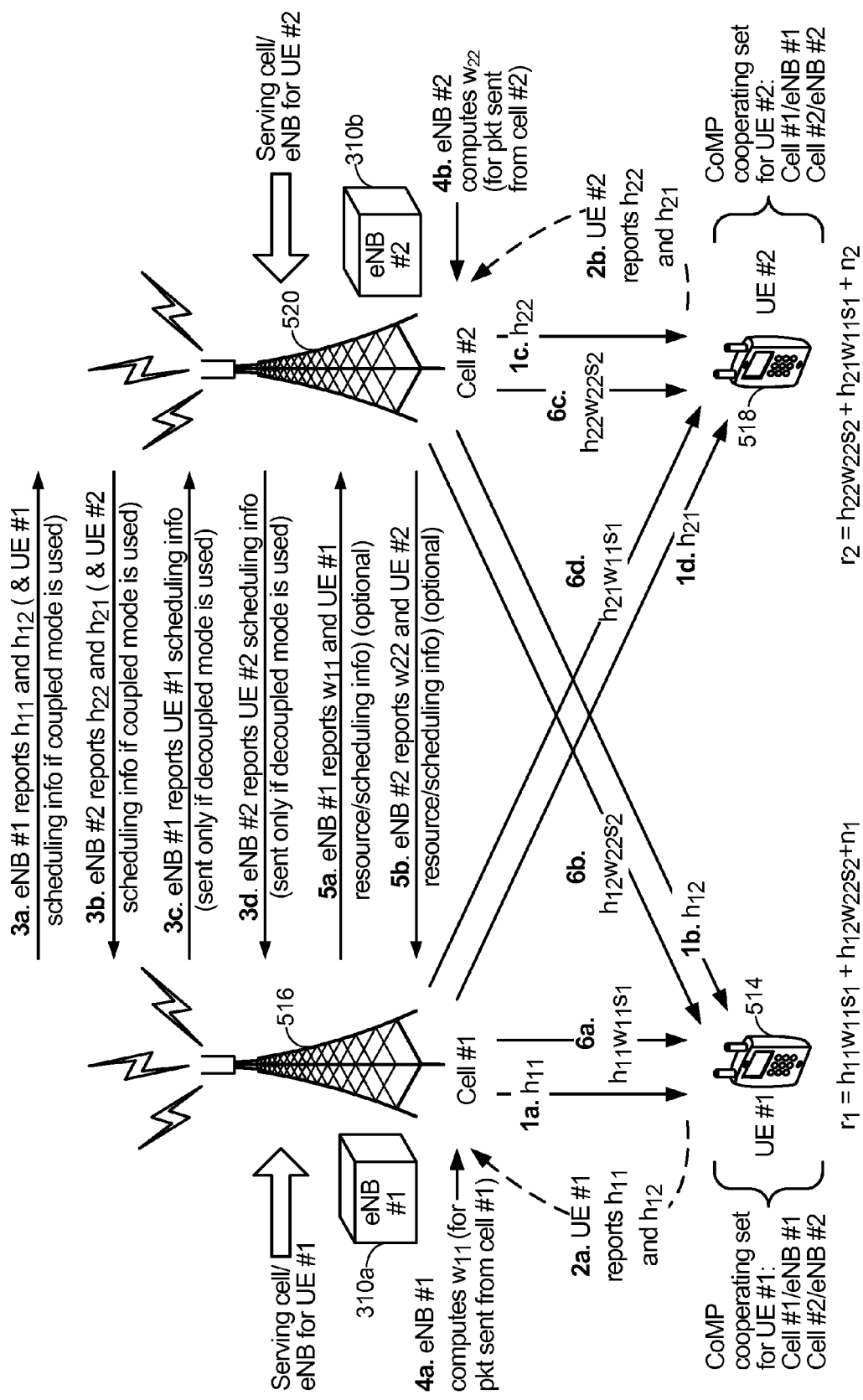
FIG. 10A illustrates a CoMP transmission procedure with dynamic cell selection (DCS) from a serving cell.

FIG. 10A illustrates another example of a downlink CoMP transmission procedure with dynamic cell selection (DCS) from a serving cell 516. In this example illustration, there are two eNodeBs, 310a and 310b and two UEs 514 and 518. In one example, the channel reports from the UEs 514 and 518 include composite propagation channel transfer functions between the eNodeBs 310a and 310b and the UEs 514 and 518 may be represented by a complex transmission or CSI matrix.

The downlink CoMP transmission procedure begins at steps 1a-d with initial reference signal transmissions (which may or may not include data transmissions) from both eNodeBs 310, to both UEs 514, 518, where each initial reference signal transmission received is affected by one of the four elements of the complex transmission matrix H. From the initial reference signal transmission received signals, at step 2a, the first UE 514 may estimate and report back to the first eNodeB 310a the transfer functions h11 and h12. Similarly, at step 2b, the second UE 518 may estimate and report back to the second eNodeB 310b the transfer functions h21 and h22. Next, at steps 3a-d, the eNodeBs 310a, 310b exchange their individual reported transfer functions with each other so that each eNodeB may construct an estimated complex transmission matrix H'. Optionally, if a coupled mode of operation is used, then UE scheduling information may also include a single message exchanged between the eNodeBs 310. The UE scheduling information includes subframe number and physical resource blocks to be allocated for a UE data transmission.

At step 4a, the eNodeB 310a computes weight (i.e., precoding) w11 for the UE 514. Similarly, at step 4b, the eNodeB 310b computes weight (i.e., precoding) w22 for UE 518. Next, at step 5a, the eNodeB 310a reports weight w11 and resource/scheduling information to the eNodeB 310b. Similarly, at step 5b, the eNodeB 310b reports weight w22 and resource/scheduling information to the eNodeB 310a. The UE scheduling information is the same as the UE scheduling information communicated between eNodeBs in a previous block, although an efficient mapping/compression scheme may be used to convey this information.

Next, at steps 6a-d given desired symbols s1 and s2 for UE 514 and UE 518, respectively, the eNodeB 310a transmits a weighted transmit signal w11s1 and the eNodeB 310b transmits a weighted signal w22s2. After transmission through the propagation channel, the received waveform at each UE is given by:

$$r_1 = h_{11}w_{11}s_1 + h_{12}w_{22}s_2 + n_1; \quad (1)$$

$$r_2 = h_{22}w_{22}s_1 + h_{21}w_1s_2 + n_2 \quad (2)$$

where for these equations, $r_1$=received waveform at UE 514,
$r_2$=received waveform at UE 518,
$n_1$=additive noise at UE 514, and
$n_2$=additive noise at UE 518

Figure 10B:
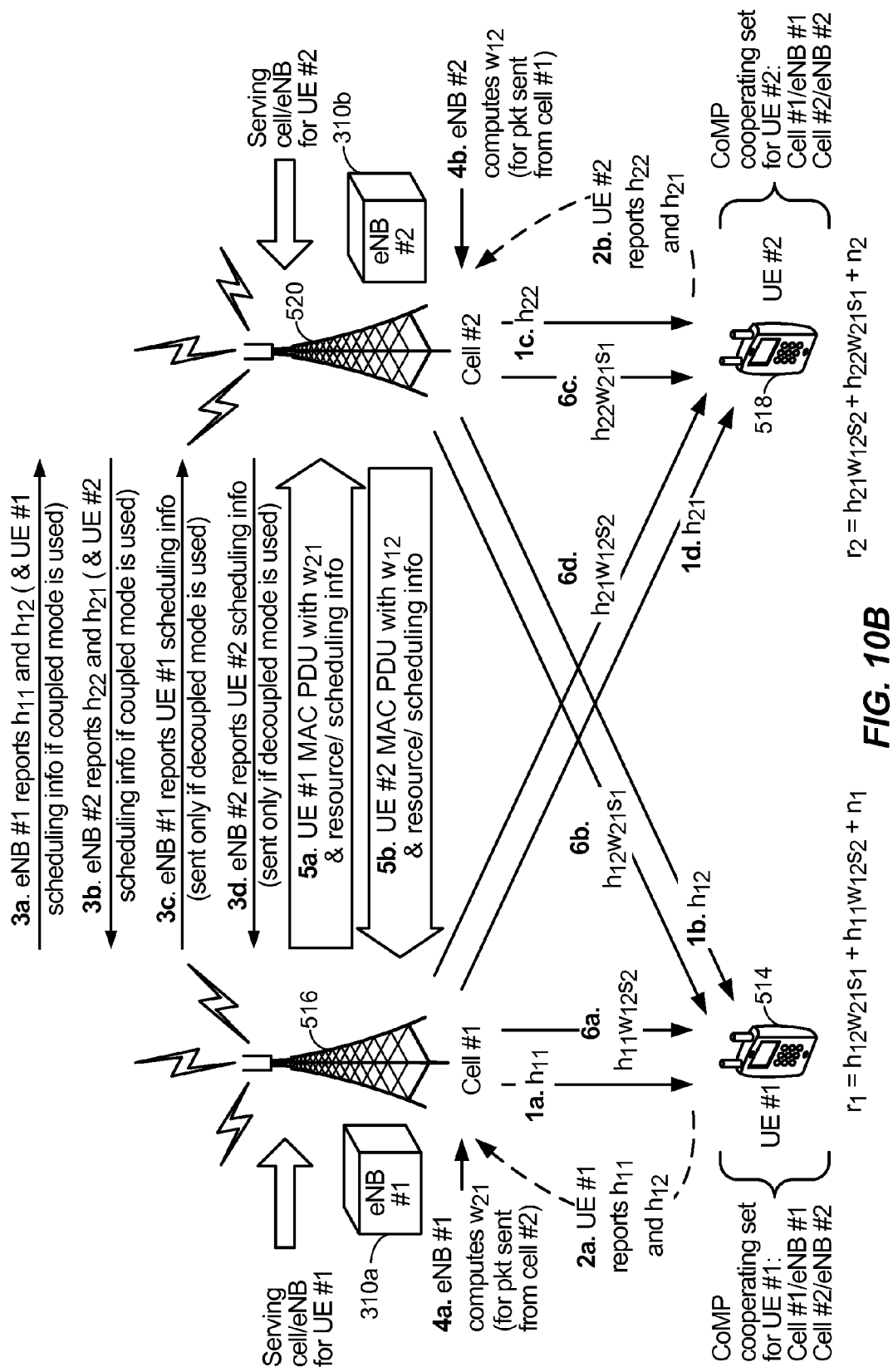
FIG. 10B illustrates a CoMP transmission procedure with dynamic cell selection (DCS) from a non-serving cell.

Assuming that the transmission delay due to the X2 interface is small relative to the channel delay spread and the time required for the eNodeBs to exchange control information, then, ideally, for r1, the term (h12w22)s2 will approach zero. Likewise, for r2, the term (h21w11)s1 will approach zero FIG. 10B illustrates another example of a downlink CoMP transmission procedure with dynamic cell selection at a non-serving cell. In this example illustration, there are two eNodeBs 310a, 310b and 310b and two UEs 514 and 518. In one example, the channel reports from the UEs 514 and 518 include composite propagation channel transfer functions between the eNodeBs 310 and the UEs 514 and 518 may be represented by a complex transmission or CSI matrix.

The downlink CoMP transmission procedure begins at steps 1a-d with initial reference signal transmissions from both eNodeBs 310 to both UEs 514, 518, where each initial reference signal transmission received is affected by one of the four elements of the complex transmission matrix H. From the initial reference signal transmission received signals, at step 2a the first UE 514 may estimate and report back to the first eNodeB 310a the transfer functions h11 and h12. Similarly, at step 2b the second UE 518 may estimate and report back to the second eNodeB 310b the transfer functions h21 and h22 in block 2. Next, at blocks 3a-d the eNodeBs 310a and 310b exchange their individual reported transfer functions with each other so that each eNodeB may construct an estimated complex transmission matrix H'. Optionally, if a coupled mode of operation is used, then UE scheduling information may also include a single message exchanged between the eNodeBs 310.

The UE scheduling information may include a subframe number and physical resource blocks to be allocated for a UE data transmission. At step 4a the eNodeB 310a computes weight (i.e., precoding) w21 for the UE 514. Similarly, at step 4b the eNodeB 310b computes weight (i.e., precoding) w12 for UE 518. Next, at step 5a the eNodeB 310a reports weight w21 via the UE 514 MAC PDU and resource/scheduling information to the eNodeB 310b. Similarly, at step 5b the eNodeB 310b reports weight w12 via UE 518 MAC PDU and resource/scheduling information to the eNodeB 310a. The UE scheduling information is the same as the UE scheduling information communicated between eNodeBs in a previous block, although an efficient mapping/compression scheme may be used to convey this information.

Next, at steps 6a-d given desired symbols s1 and s2 for UE 514 and UE 518, respectively, the eNodeB 310a transmits a weighted transmit signal w12s2 and the eNodeB 310b transmits a weighted signal w21s1. After transmission through the propagation channel, the received waveform at each UE is given by:

$$r_1 = h_{12}w_{21}s_1 + h_{11}w_{12}s_2 + n_1; \quad (1)$$

$$r_2 = h_{21}w_{12}s_2 + h_{22}w_{21}s_1 + n_2 \quad (2)$$

where for these equations, $r_1$=received waveform at UE 514,
$r_2$=received waveform at UE 518,
$n_1$=additive noise at UE 514, and
$n_2$=additive noise at UE 518.

Assuming that the transmission delay due to the X2 interface is small relative to the channel delay spread and the time required for the eNodeBs to exchange control information and data, then, ideally, for r1, the term (h11w12)s2 will approach zero. Likewise, for r2, the term (h22w21)s1 will approach zero.

Figure 11:
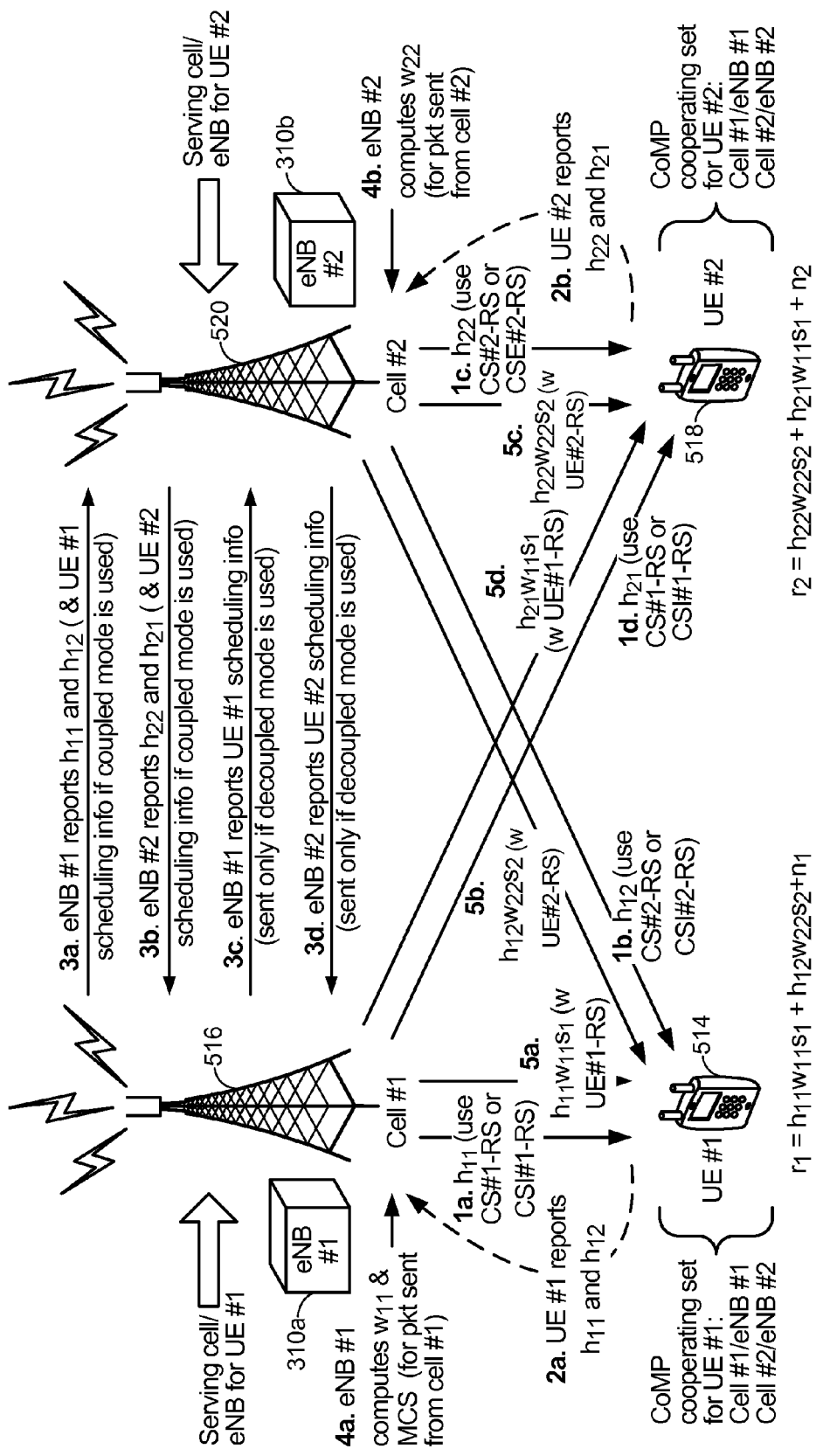
FIG. 11 illustrates a downlink CoMP transmission procedure with coordinated scheduling/beamforming.

FIG. 11 illustrates another example of a downlink CoMP transmission procedure with coordinated scheduling and beamforming (CS/CB). In this example illustration, there are two eNodeBs 310a, 310b and 310b and two UEs 514 and 518. In one example, the channel reports from the UEs 514 and 518 include composite propagation channel transfer functions between the eNodeBs 310 and the UEs 514 and 518 may be represented by a complex transmission or CSI matrix The downlink CoMP transmission procedure begins at steps 1a-d with initial reference signal transmissions (which may or may not include data transmissions) from both eNodeBs 310 to both UEs 514, 518, where each initial reference signal transmission received is affected by one of the four elements of the complex transmission matrix H. From the initial reference signal transmission received signals, at step 2*a* the first UE 514 may estimate and report back to the first eNodeB 310*a* the transfer functions h11 and h12. Similarly, at step 2*b* the second UE 518 may estimate and report back to the second eNodeB 310*b* the transfer functions h21 and h22 in block 2. Next, at steps 3*a-d* the eNodeBs 310 exchange their individual reported transfer functions with each other so that each eNodeB may construct an estimated complex transmission matrix H'. Optionally, if a coupled mode of operation is used, then UE scheduling information may also include a single message exchanged between the eNodeBs 310.

The UE scheduling information may include a subframe number and physical resource blocks to be allocated for a UE data transmission. At step 4*a* the eNodeB 310*a* computes weight (i.e., precoding) w11 for UE 514. Similarly, at step 4*b* the eNodeB 310*b* computes weight (i.e., precoding) w22 for UE 518. The UE scheduling information is the same as the UE scheduling information communicated between eNodeBs in a previous block, although an efficient mapping/compression scheme may be used to convey this information.

Next, at steps 5*a-d* given desired symbols s1 and s2 for UE 514 and UE 518, respectively, the eNodeB 310*a* transmits a weighted transmit signal w11s1 and the eNodeB 512 transmits a weighted signal w22s2. After transmission through the propagation channel, the received waveform at each UE is given by:

$$r_1 = h_{11}w_{11}s_1 + h_{12}w_{22}s_2 + n_1; \quad (1)$$

$$r_2 = h_{22}w_{22}s_1 + h_{21}w_{11}s_1 + n_2 \quad (2)$$

where for these equations, $r_1$=received waveform at UE 514,
$r_2$=received waveform at UE 518,
$n_1$=additive noise at UE 514, and
$n_2$=additive noise at UE 518.

Assuming that the transmission delay due to the X2 interface is small relative to the channel delay spread and the time required for the eNodeBs to exchange control information, then, ideally, for r1, the term (h12w22)s2 will approach zero. Likewise, for r2, the term (h21w11)s1 will approach zero.

Figure 12:
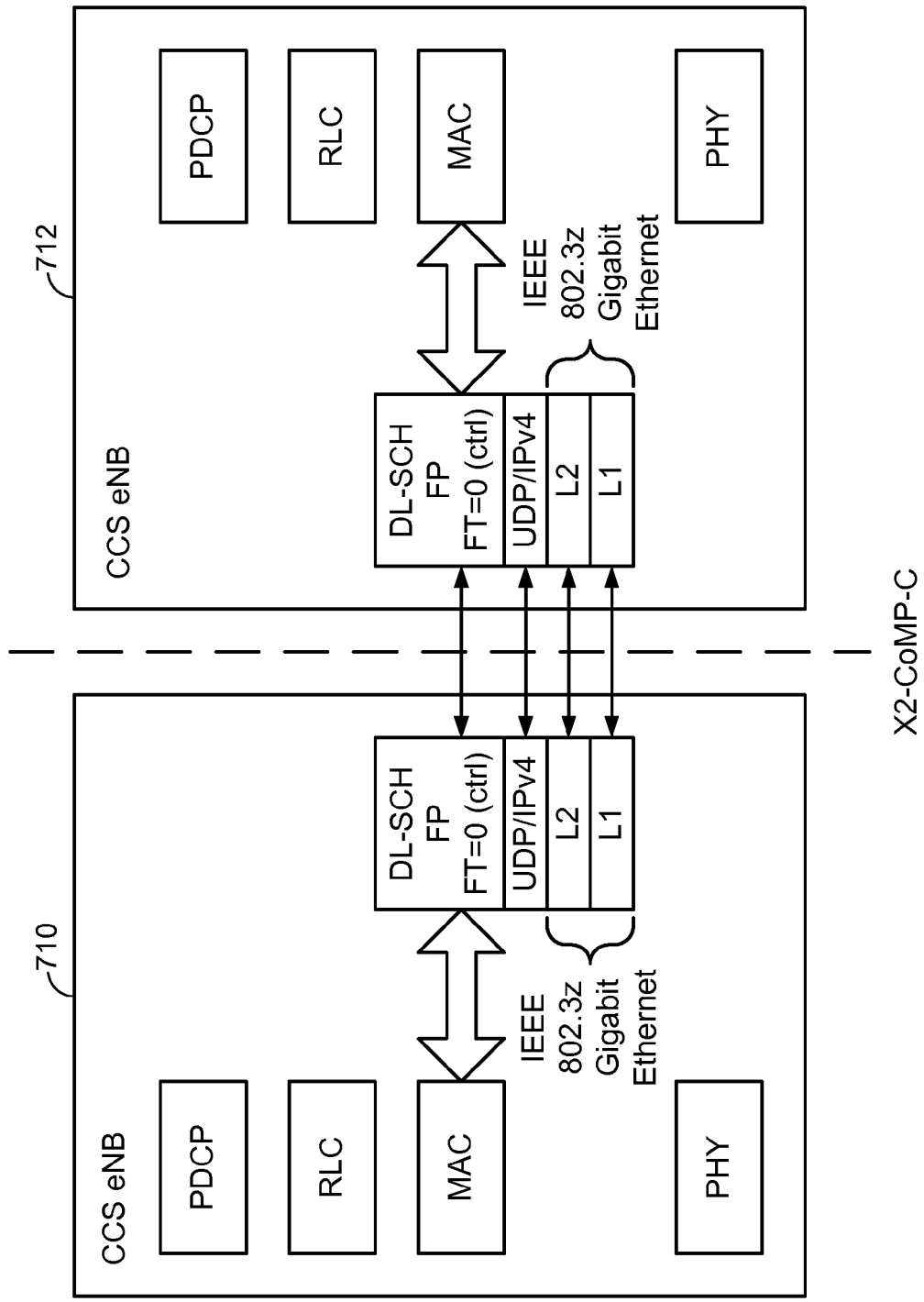
FIG. 12 illustrates an example X2 interface protocol architecture for the control plane with CoMP (X2-DL-CoMP-C).

FIG. 12 illustrates an example X2 interface protocol architecture for the control plane with downlink CoMP (X2-DL-CoMP-C). The figure shows peer-to-peer control plane communication using a downlink shared channel frame protocol (DL-SCH FP) between a serving eNodeB 710 and a CoMP coordinating set (CCS) eNodeB 712 which may be eNBs 100 as described in FIG. 2. In one example, the DL-SCH FP contains a frame type (FT) label of 0 in this case to indicate a control data message. In one embodiment, the DL-SCH messaging is transported by a layered protocol stack such as UDP/IPv4/L2/L1, with the IEEE 802.3z Gigabit Ethernet protocol as one example L2/L1 protocol set. The control messaging occurs at the MAC layer. In one example, with reference to FIG. 2, the control messages can be generated by the controller/processor 240 and the scheduler 244 and transmitted via the X2 interface 241.

The MAC layer in the serving eNodeB 710 makes a scheduling decision based upon UE measurement reports. The serving eNodeB MAC layer is also the entity that processes the UE's HARQ ACK/NACKs for the data transmitted on the downlink from the serving eNodeB 710 (and/or CCS eNodeB (s)). Therefore, the serving eNodeB MAC layer is the entity that will schedule MAC retransmissions as well. In contrast, the CCS eNodeB MAC layer scheduler only receives the scheduling information (and data) from the serving eNodeB 710 and is concerned only with scheduling UE's for which it is the serving eNodeB (in conjunction with using the scheduling information sent from the serving eNodeB to the CCS eNodeB).

Figure 13:
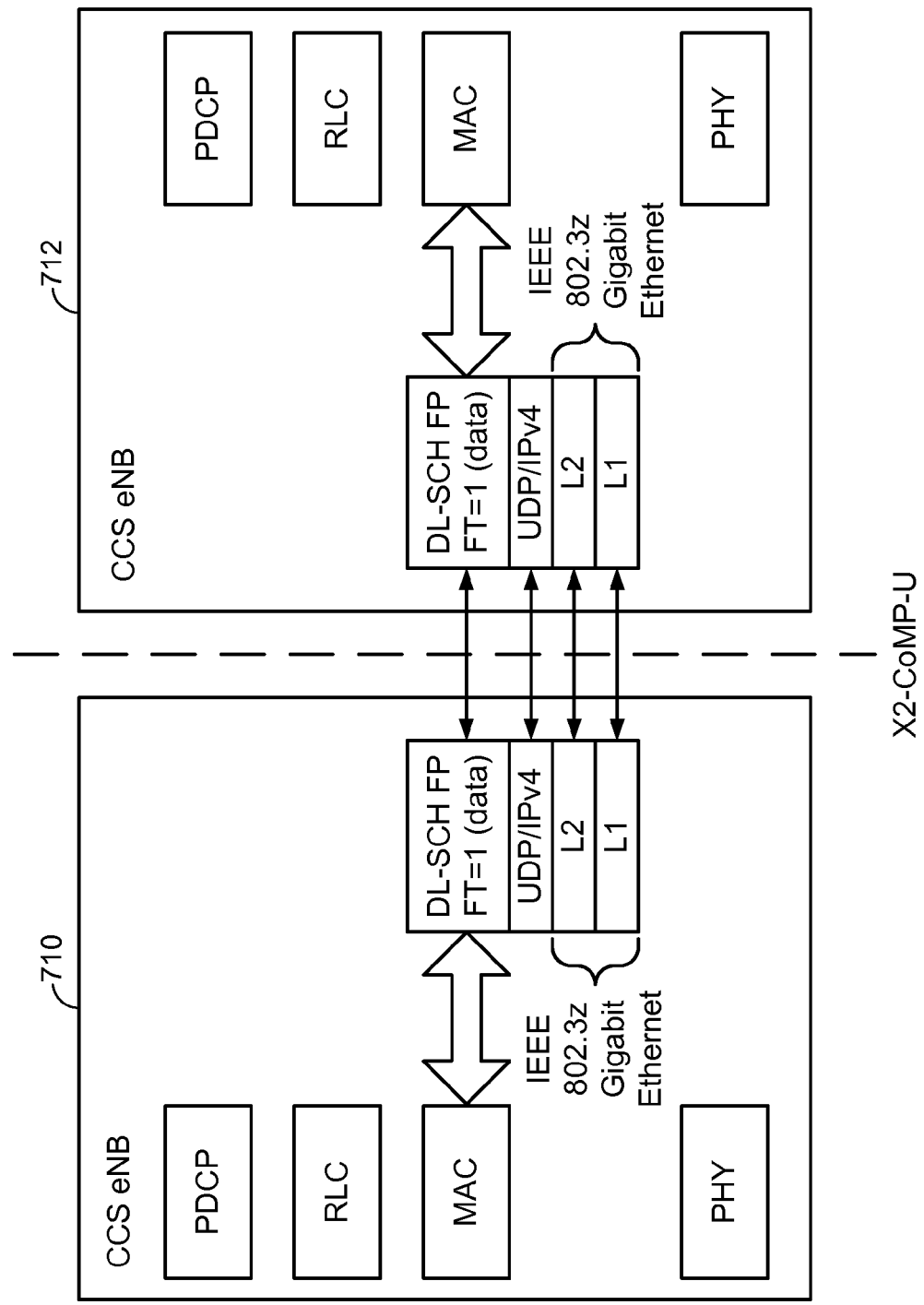
FIG. 13 illustrates an example X2 interface protocol architecture for the user plane with CoMP (X2-DL-CoMP-U).

FIG. 13 illustrates an example X2 interface protocol architecture for the user plane with CoMP (X2-DL-CoMP-U). The figure shows peer-to-peer user plane communication using a downlink shared channel frame protocol (DL-SCH FP) between both a serving eNodeB 710 and a CoMP coordinating set (CCS) eNodeB 712. In one example, the DL-SCH FP contains a frame type (FT) label of 1 in this case to indicate a user data message. In one embodiment, the DL-SCH messaging is transported by a layered protocol stack such as UDP/IPv4/L2/L1, with the IEEE 802.3z Gigabit Ethernet protocol as one example L2/L1 protocol set. The data messaging occurs at the MAC layer. Additionally, scheduling decisions occur at the MAC layer and PDUs are formulated there as well. The control messages are sent with the PDUs to allow for faster transmission and to avoid retransmission of the information. This allows the information to be relayed to other eNodeBs while the information is still accurate. In one example, with reference to FIG. 2, the control messages can be generated by the controller/processor 240 and the scheduler 244 and transmitted via the X2 interface 241.

Figures 14, 15:
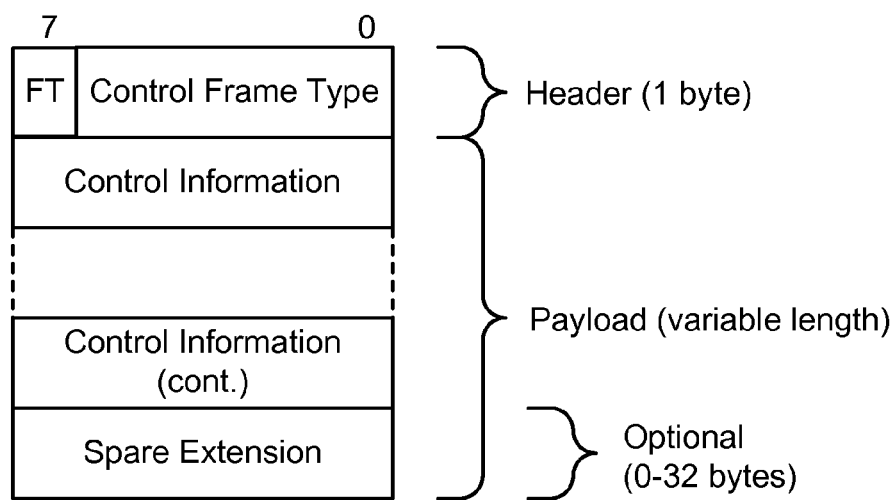
FIG. 14 illustrates an example control frame header structure for a DL-SCH frame protocol.
FIG. 15 illustrates an example control frame structure for a DL-SCH frame protocol.

In one example, a control frame header structure for a DL-SCH frame protocol is shown in FIG. 14. For this example, the frame type (FT) label=0 to designate control data. The control frame structure could include several values to indicate the type of transported control information. For example, a Channel State Information message may indicated with a value of 0. The Channel State Information message would contain scheduling information in addition to channel state information (CSI) if a "coupled" mode of operation is used. A Scheduling Information message could be indicated with a value of 01. The Scheduling Information message would be used if a "decoupled" mode of operation is used. In another example, flow control information such as Resource Status Request message and Resource Status Indication message may be indicated with values of 10 and 11. The Resource Status Request message would be used by a serving eNodeB to query a CCS eNodeB about the status of the X2-CoMP-U interface backhaul throughput and delay in addition to radio resource availability. Additionally, the Resource Status Indication message would be used by a CCS eNodeB to inform a serving eNodeB about the status of the X2-CoMP-U interface backhaul throughput and delay in addition to radio resource availability. This message may be sent autonomously (i.e., without receiving a Resource Status Request message beforehand). A Beamforming Vector Information message may be indicated with a value of 100. The Beamforming Vector Information message would communicate weight (wij) information between CCS eNodeBs. Of course, other control data could be communicated and indicated in the control frame header.

In another example, a control frame structure for a DL-SCH frame protocol is shown in FIG. 15. In one embodiment, the control frame type message discussed above has a fixed size of one byte within a fixed header field size of 2 bytes. Optionally, the payload field follows the header field and has a variable length size.

Figure 16:
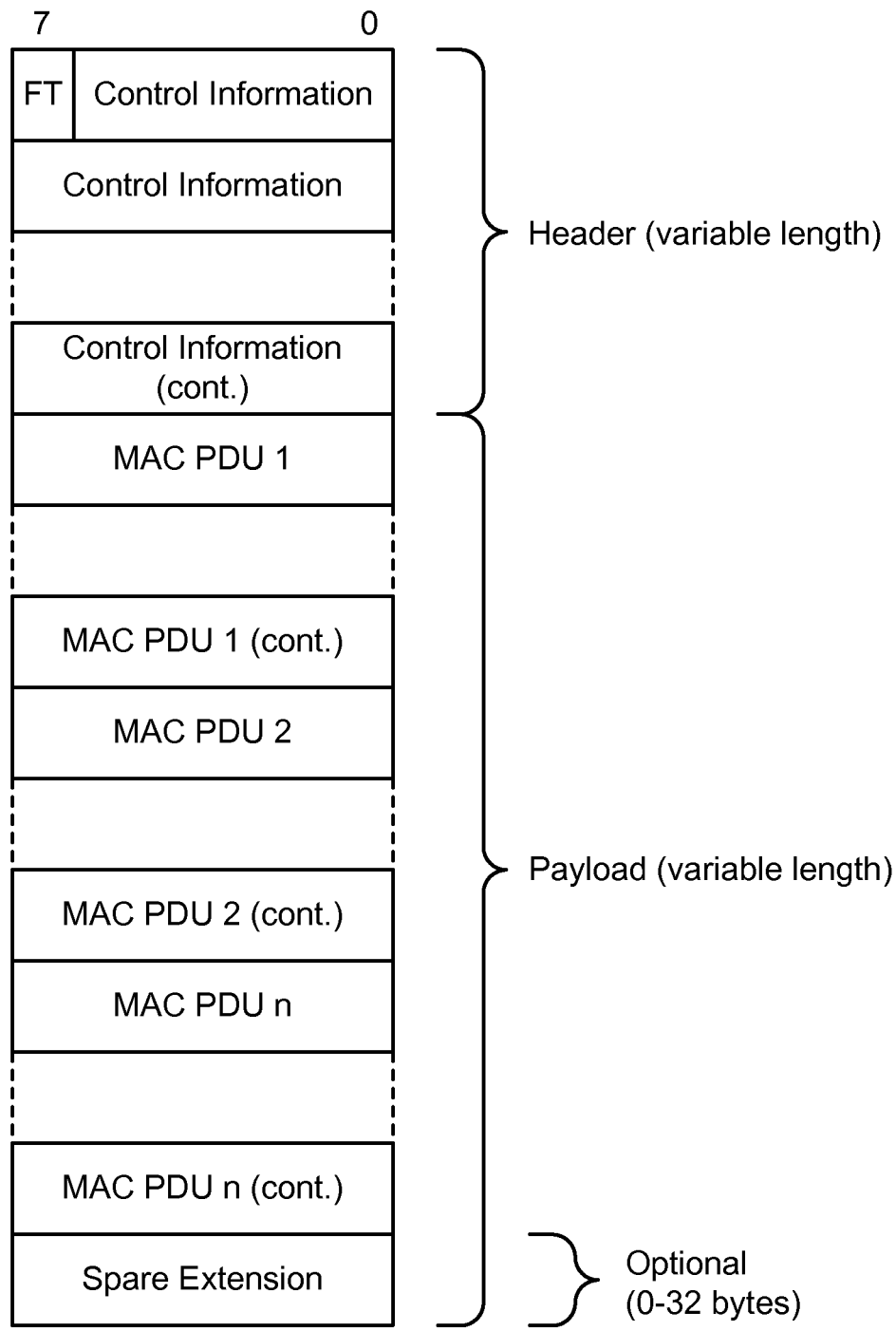
FIG. 16 illustrates an example data frame structure for a DL-SCH frame protocol.

In one example, a data frame structure for a DL-SCH frame protocol is shown in FIG. 16. In this example, the frame type (FT) label=1 to designate user data. The data frame consists of a header field with the FT label as well as control information. The data frame also consists of a payload field of variable length which consists of MAC protocol data units (PDUs). The control information would indicate the length and number of MAC PDUs in addition to weight information and resource/scheduling information. It is noted that the MAC PDUs according to one aspect of the present disclosure do not include MAC control elements, as would traditionally be included.

Figure 17:
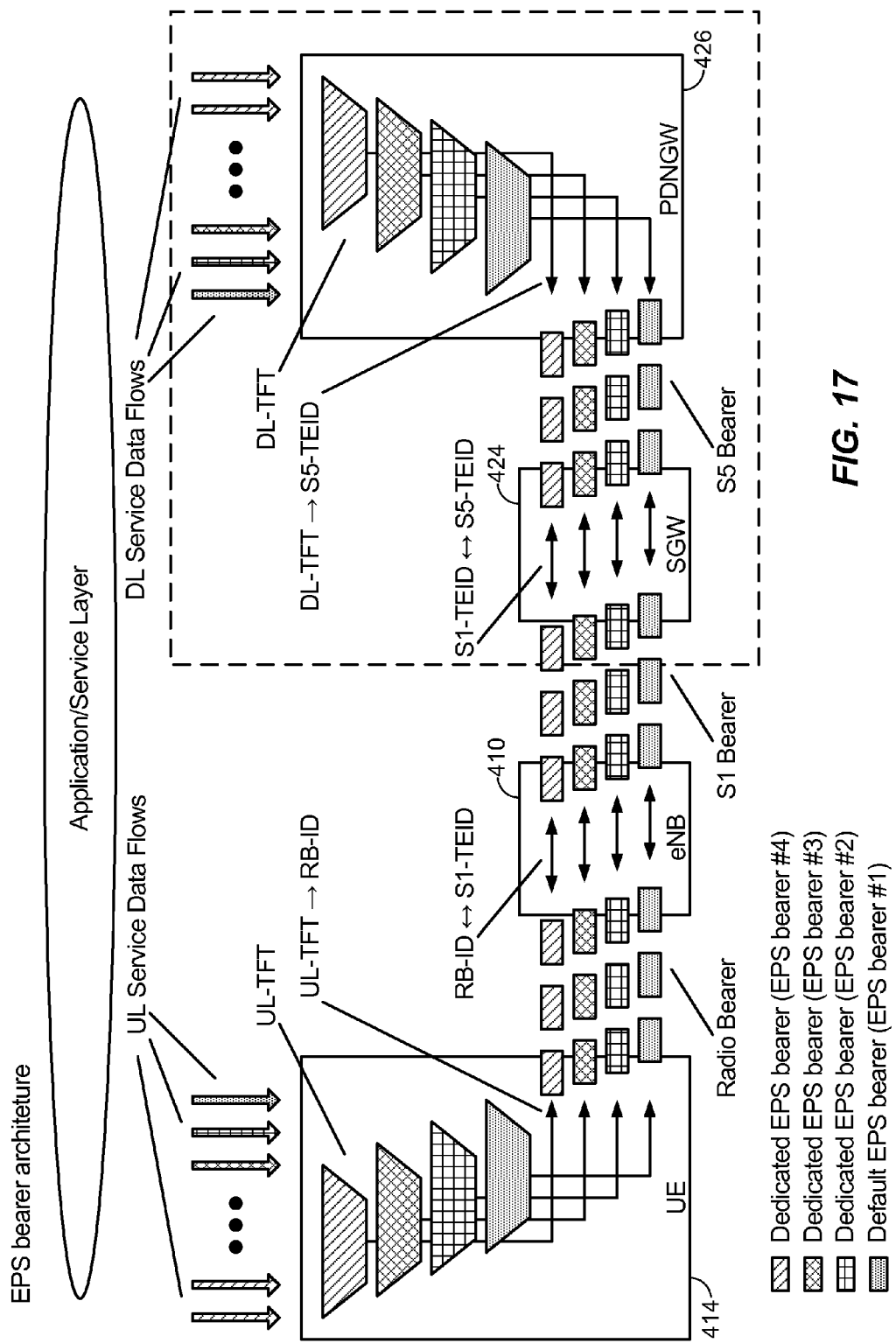
FIG. 17 illustrates an example Evolved Packet System (EPS) bearer architecture.

FIG. 17 illustrates an example Evolved Packet System (EPS) bearer architecture. In the example illustration, downlink service data flows from the application/service layer to enter a downlink traffic flow template (DL-TFT) in the PDNGW 426 and is then transported to the SGW 424 over a S5 bearer, onto the eNodeB 410 over a S1 bearer, and then onto the UE 414 over a radio bearer. The S5 and S1 bearer comprise UE IP packets which are tunneled using GTP/UDP/IP encapsulation. The radio bearer comprises a MAC PDU which carries an RLC PDU(s) which in turn carry an IP packet(s) or a segment of an IP packet(s). Similarly, uplink service data flows from the application/service layer enter an uplink traffic flow template (UL-TFT) in the UE 414 and are transported to the eNodeB 410 over a radio bearer, onto the SGW 424 over a 51 bearer, and then onto the PDNGW 426 over a S5 bearer.

Figure 18:
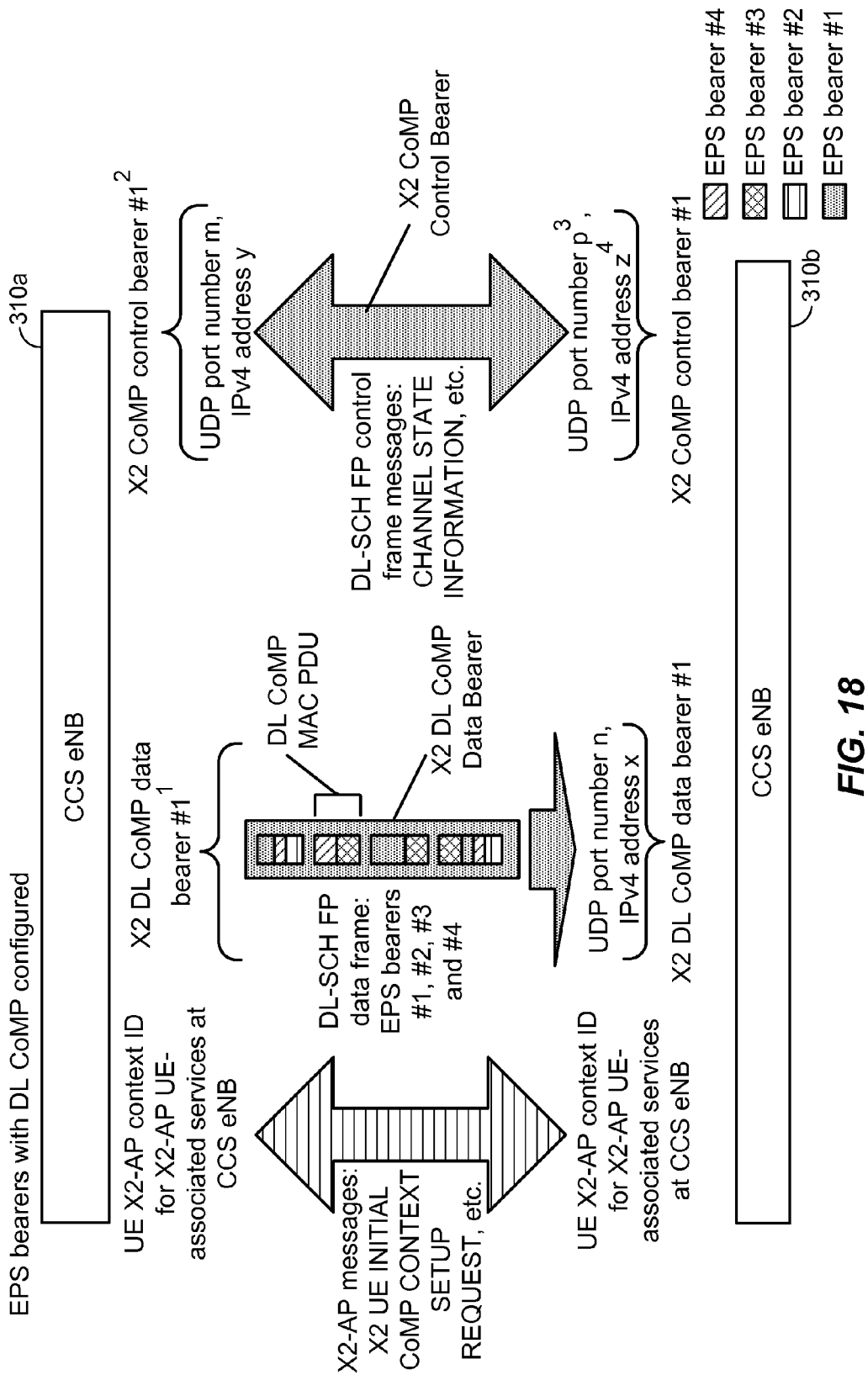
FIG. 18 illustrates an example Evolved Packet System (EPS) bearer architecture during downlink CoMP.

FIG. 18 illustrates an example Evolved Packet System (EPS) bearer architecture during downlink CoMP. In this instance, downlink service data flows are transported between eNodeBs 310a and 310b over an X2 DL CoMP data bearer. As noted above, the X2 DL CoMP data bearer includes a MAC PDU(s) with resource/scheduling information encapsulated in a DL-SCH FP data frame. There is one X2 DL CoMP data bearer per UE if DL CoMP DCS or JT is activated for that UE. Also, DL-SCH FP control frames are transported between eNodeBs 310 over an X2 DL CoMP control bearer. There is one X2 DL CoMP control bearer per serving eNode/CCS eNodeB pair if DL CoMP CS/CB, DCS or JT is activated for one or more UEs belonging to the serving eNodeB.

Figure 19:
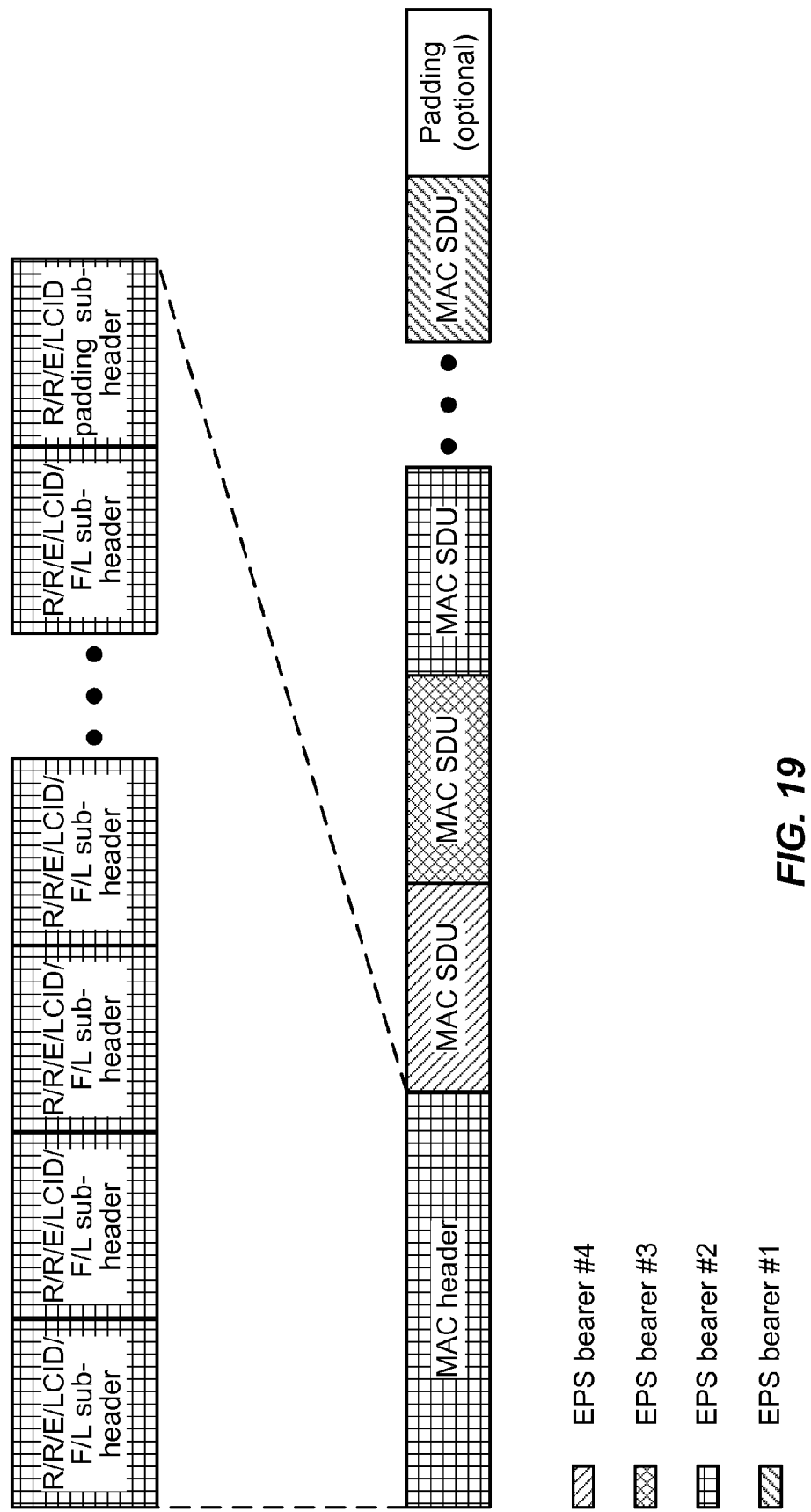
FIG. 19 illustrates an example downlink CoMP MAC protocol data unit (PDU).

In one aspect, a prior art MAC PDU consists of a MAC header, zero or more MAC service data units (SDUs), zero or more MAC control elements, and optional padding. The MAC SDUs may contain RLC PDUs for Signaling Radio Bearers (SRBs) or Data Radio Bearers (DRBs) (i.e., EPS bearers). According to an aspect of the present disclosure, a downlink CoMP MAC PDU consists of a MAC header, one or more MAC SDUs and optional padding, as shown in FIG. 19. In one embodiment of downlink CoMP MAC PDUs, the serving eNodeB MAC scheduler generally tries not to schedule MAC Control elements or SRBs with DRBs that are configured for DL CoMP service.

In one embodiment, the Downlink CoMP protocol consists of several X2-AP management procedures and messages. The procedures may relate to either CoMP X2 non UE-associated services or UE-associated services. The non UE-associated services are used to establish, manage and teardown an X2 DL CoMP control bearer between a serving eNodeB/CCS eNodeB pair. The UE-associated services are used to establish, manage and teardown X2 DL CoMP data bearers per UE. In one embodiment, non UE-associated services include: X2 DL CoMP Control Bearer Setup, X2 DL CoMP Control Bearer Modify, and X2 DL CoMP Control Bearer Release procedures.

Figure 20A:
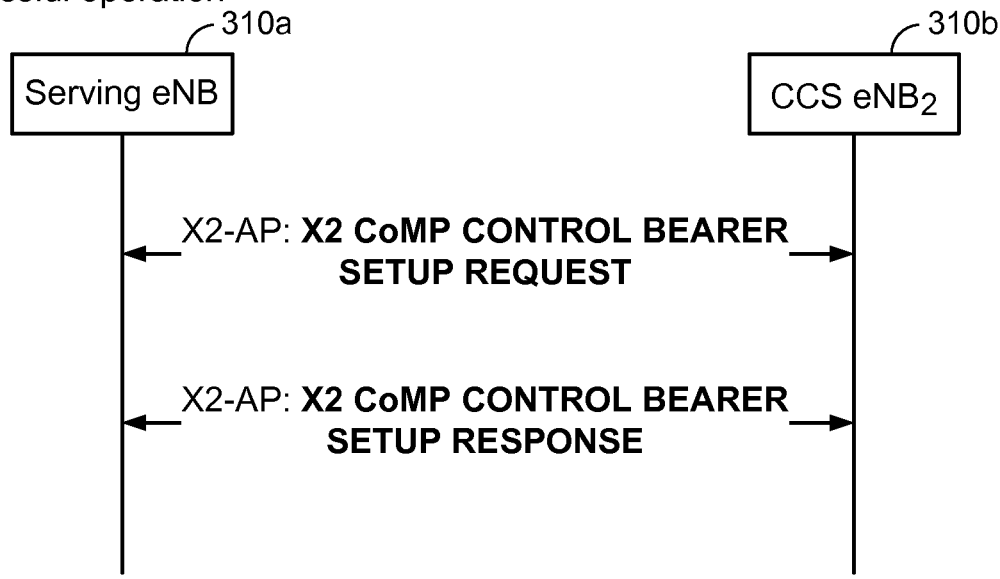
FIGS. 20A-B illustrate an example X2 DL CoMP Control Bearer Setup procedure between a serving eNodeB and a CCS eNodeB for two cases: successful operation and unsuccessful operation.
Figure 20B:
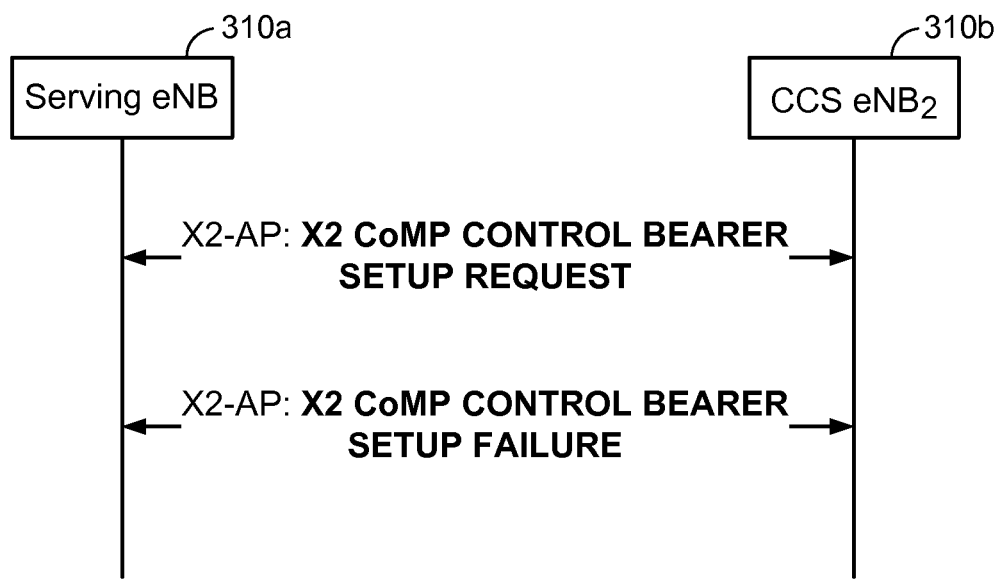

FIGS. 20A-B illustrate an example X2 DL CoMP Control Bearer Setup procedure between a serving eNodeB 310a and a CCS eNodeB 310b for two cases: successful operation and unsuccessful operation. This procedure sets up the X2 DL CoMP control bearer shown in FIG. 18 (where there is one X2 DL CoMP control bearer per serving eNodeB/CCS eNodeB pair). The procedure involves allocating a UDP port number(s) and IP address(es) to be used for the X2 DL CoMP control bearer in addition to admission control and allocation of a unique ID per UE. For the successful operation (FIG. 20A), the procedure includes exchanges of a control bearer setup request message and a control bearer setup response message. For the unsuccessful operation (FIG. 20B), the procedure includes a control bearer setup response message and a control bearer setup failure message.

Figure 21A:
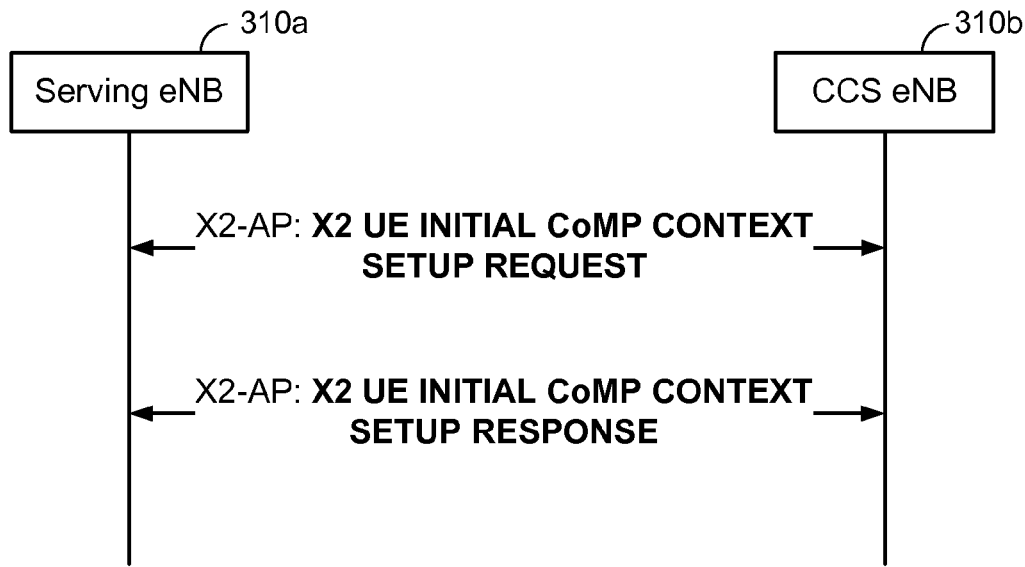
FIGS. 21A-B illustrate an example X2 UE Initial DL CoMP Context Setup procedure between a serving eNodeB and a CCS eNodeB, for a successful operation and an unsuccessful operation.
Figure 21B:
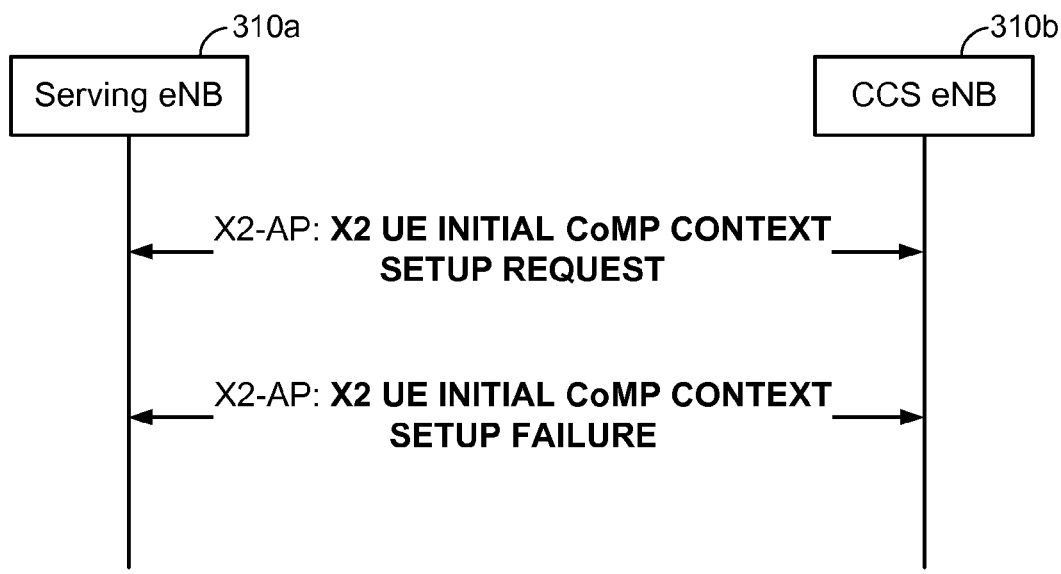

FIGS. 21A-B illustrate an example X2 UE Initial DL CoMP Context Setup procedure (which is a UE-associated service) between a serving eNodeB 310a and a CCS eNodeB 310b, for two cases: successful operation and unsuccessful operation. This procedure sets up the X2 DL CoMP data bearer shown in FIG. 18 (where there is one X2 DL CoMP data bearer for each UE for which DL CoMP service is configured) and is applicable only for a UE which has DL CoMP DCS or JT activated. The procedure involves allocating a UDP port number(s) and IP address(es) to be used for the X2 DL CoMP data bearer in addition to admission control. For the successful operation (FIG. 21A), the serving eNodeB 310a sends an X2 UE INITIAL CoMP CONTEXT SETUP REQUEST message to the CCS eNodeB 310b. Upon receiving the message from the serving eNodeB 310a, the CCS eNodeB 310b decides that it can establish the X2 UE CoMP context and then sends an X2 UE INITIAL CoMP CONTEXT SETUP RESPONSE message to the serving eNodeB 310a.

If the operation is unsuccessful (FIG. 21B), the serving eNodeB 310a sends an X2 UE INITIAL CoMP CONTEXT SETUP REQUEST message to the CCS eNodeB 310b. Upon receiving the message from the serving eNodeB 310a, the CCS eNodeB 310b decides that it cannot establish the X2 UE CoMP context and sends an X2 UE INITIAL CoMP CONTEXT SETUP FAILURE message.

Figure 22:
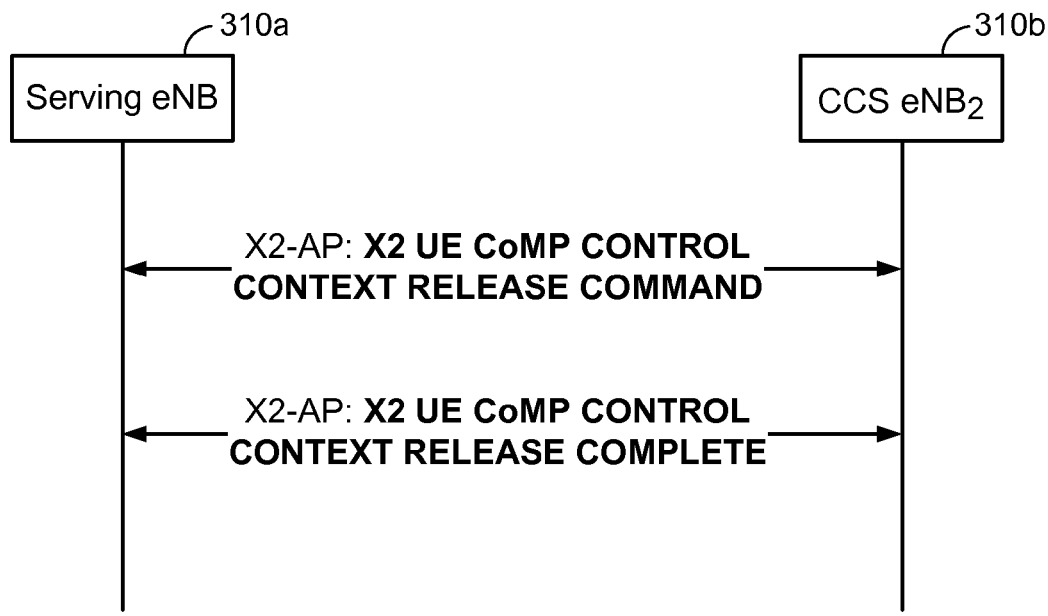
FIG. 22 illustrates an example X2 UE DL CoMP Context Release procedure, initiated by the serving eNodeB, for the case of a successful operation.

FIG. 22 illustrates an example X2 UE DL CoMP Context Release procedure (which is a UE-associated service), initiated by the serving eNodeB 310a, for the case of a successful procedure. An X2 UE DL CoMP CONTEXT RELEASE COMMAND is sent by the serving eNodeB 310a to the CCS eNodeB 310b. The CCS eNodeB then sends an X2 UE DL CoMP CONTEXT RELEASE RESPONSE. This procedure tearsdown the X2 DL CoMP data bearer for a UE.

Figure 23:
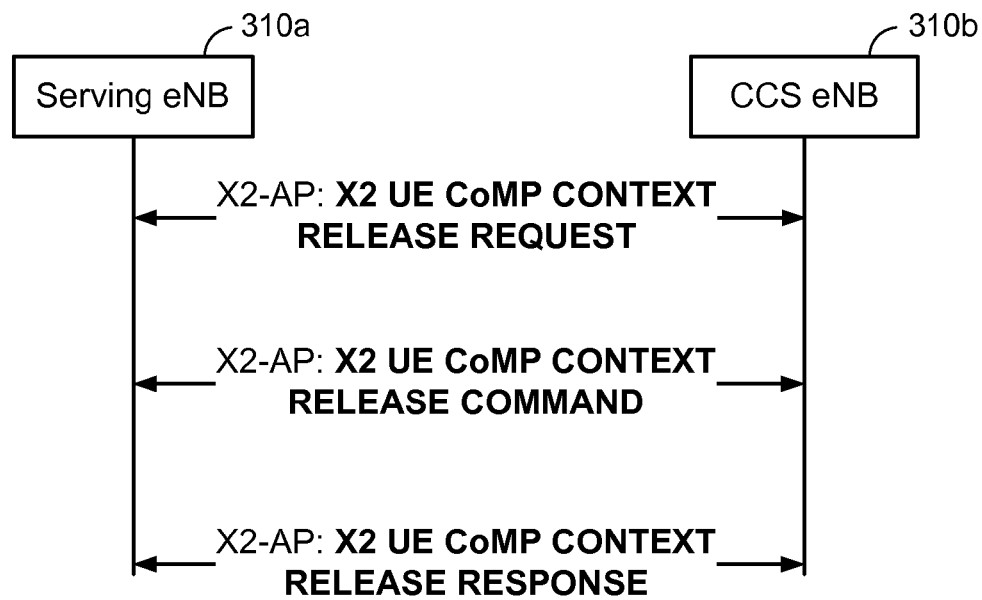
FIG. 23 illustrates an example X2 UE DL CoMP Context Release procedure, initiated by a CCS eNodeB, for the case of a successful operation.

FIG. 23 illustrates an example X2 UE DL CoMP Context Release procedure, initiated by the CCS eNodeB 310b, for the case of a successful procedure. The CCS eNodeB 310b sends an X2 UE DL CoMP CONTEXT RELEASE REQUEST message to the serving eNodeB 310a. The serving eNodeB 310a sends an X2 UE DL CoMP CONTEXT RELEASE COMMAND message to the eNodeB 310b. The eNodeB 310b then sends an X2 UE DL CoMP CONTEXT RELEASE RESPONSE message.

Figure 24:
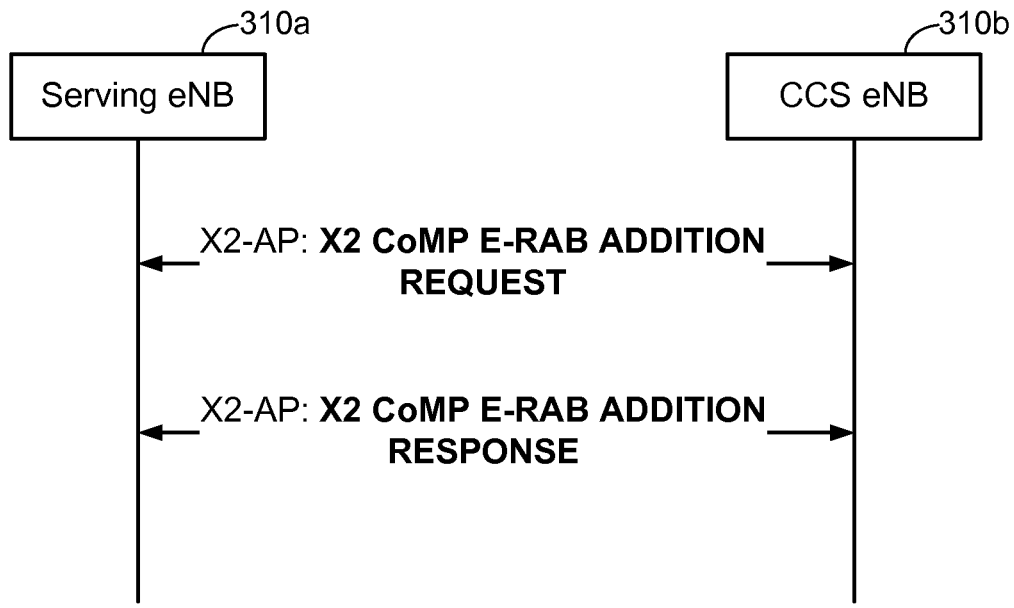
FIG. 24 illustrates an example X2 DL CoMP E-RAB Addition procedure between a serving eNodeB and a CCS eNodeB for the case of a successful operation.

FIG. 24 illustrates an example X2 DL CoMP E-RAB (Evolved-Radio Access Bearer) Addition procedure (which is a UE-associated service) between a serving eNodeB 310a and a CCS eNodeB 310b. This procedure involves admission control. The serving eNodeB 310a sends an X2 CoMP E-RAB ADDITION REQUEST message to the CCS eNodeB 310b. Upon receiving the X2 CoMP E-RAB ADDITION REQUEST message from the serving eNodeB 310a, the CCS eNodeB 310b decides that it either can or cannot add one or more of the E-RABs. The CCS eNodeB 310b sends an X2 CoMP E-RAB ADDITION RESPONSE message to the serving eNodeB 310a with its decision.

Figure 25:
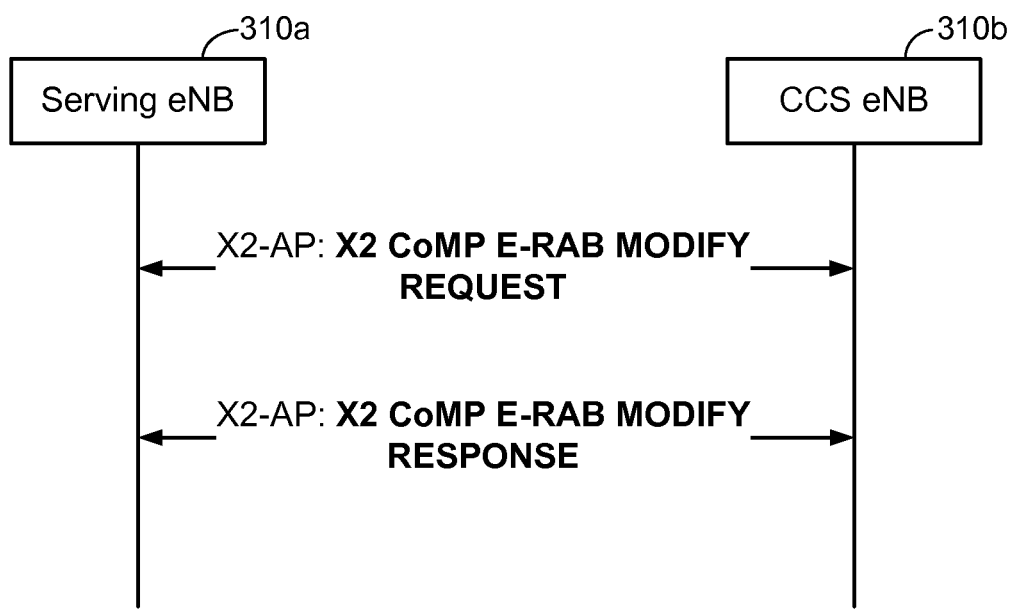
FIG. 25 illustrates an example X2 DL CoMP E-RAB Modify procedure between a serving eNodeB and a CCS eNodeB for the case of a successful operation.

FIG. 25 illustrates an example X2 DL CoMP E-RAB Modify procedure (which is a UE-associated service) between a serving eNodeB 310a and a CCS eNodeB 310b. This procedure involves admission control if the QoS of the modified X2 DL CoMP E-RAB bearer is upgraded. The serving eNodeB 310*a* sends an X2 CoMP E-RAB MODIFY REQUEST message to the CCS eNodeB 310*b*. Upon receiving the X2 CoMP E-RAB MODIFY REQUEST message from the serving eNodeB 310*a*, the CCS eNodeB 310*b* decides that it either can or cannot modify one or more of the E-RABs. The CCS eNodeB 310*b* then sends an X2 CoMP E-RAB MODIFY RESPONSE message to the serving eNodeB 310*a* with its decision.

Figure 26:
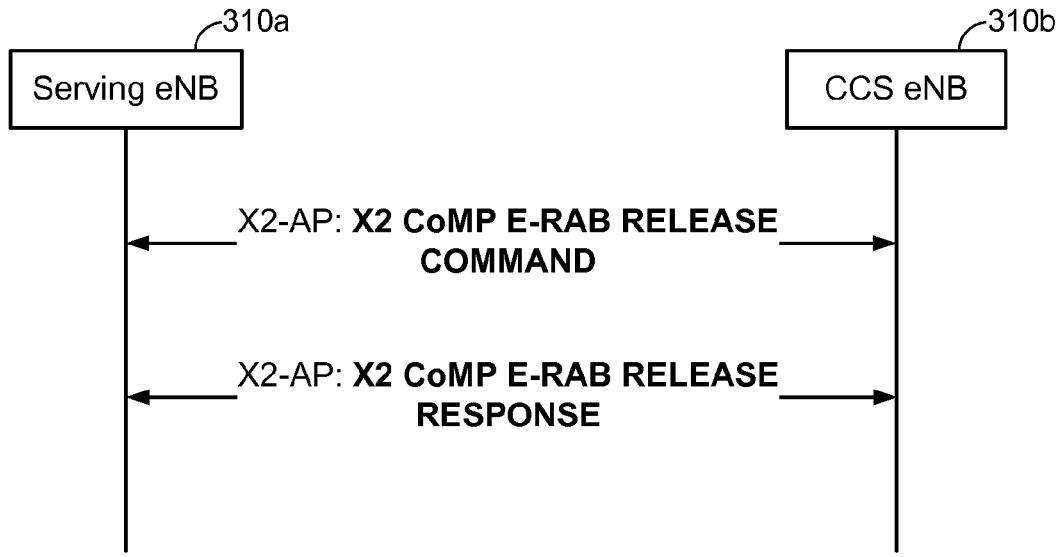
FIG. 26 illustrates an example X2 DL CoMP E-RAB Release procedure, initiated by the serving eNodeB, for the case of a successful operation.

FIG. 26 illustrates an example X2 DL CoMP E-RAB Release procedure (which is a UE-associated service), initiated by the serving eNodeB 310*a*, for the case of a successful operation. The serving eNodeB 310*a* sends an X2 DL CoMP E-RAB RELEASE COMMAND message to the CCS eNodeB 310*b*. Upon receiving the message, the CCS eNodeB 310*b* sends an X2 DL CoMP E-RAB RELEASE RESPONSE message.

Figure 27:
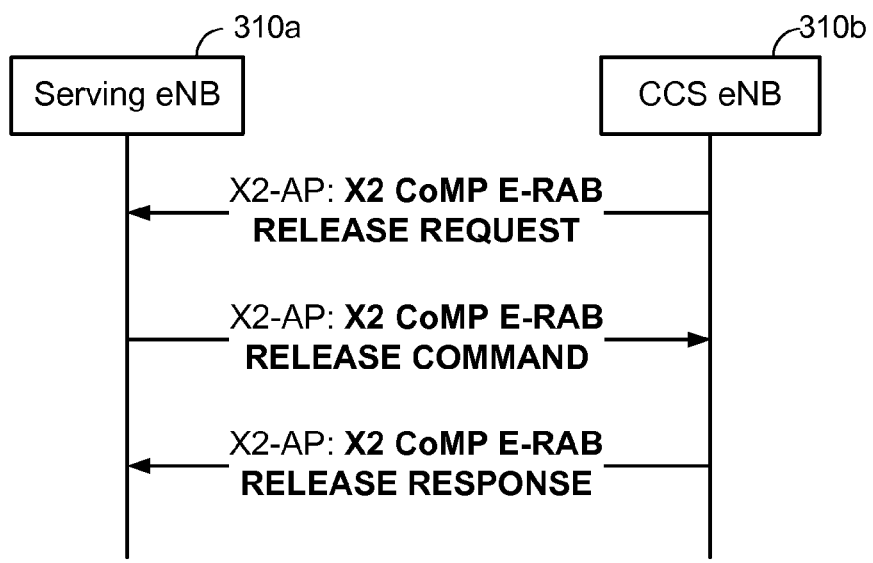
FIG. 27 illustrates an example X2 DL CoMP E-RAB Release Request procedure, initiated by a CCS eNodeB, for the case of a successful operation.

FIG. 27 illustrates an example X2 DL CoMP E-RAB Release Request procedure, initiated by a CCS eNodeB 310*b*, for the case of a successful operation. The CCS eNodeB 310*b* sends an X2 DL CoMP E-RAB RELEASE REQUEST message to the serving eNodeB 310*a*. Upon receiving the message, the serving eNodeB 310*a* sends an X2 DL CoMP E-RAB RELEASE COMMAND message to the CCS eNodeB 310*b*. In response, the CCS eNodeB 310*b* sends a X2 DL CoMP E-RAB RELEASE RESPONSE message to the serving eNodeB 310*a*.

In one embodiment, the X2 DL-SCH Frame Protocol (FP) consists of several procedures and messages, for both the control plane and the user plane. For example, DL-SCH Frame Protocol with FT=0 (control plane) has the following procedures (and associated messages): Channel State Information procedure, (sending channel state information); Scheduling Information procedure, (sending scheduling information); Resource Status Request procedure, (sending resource status request); and Resource Status Indication procedure, (sending resource status indication). Additionally, the DL-SCH Frame Protocol with FT=1 (user plane) has the following procedure and associated message: Data Transfer procedure and DL-SCH data frame.

Figure 28:
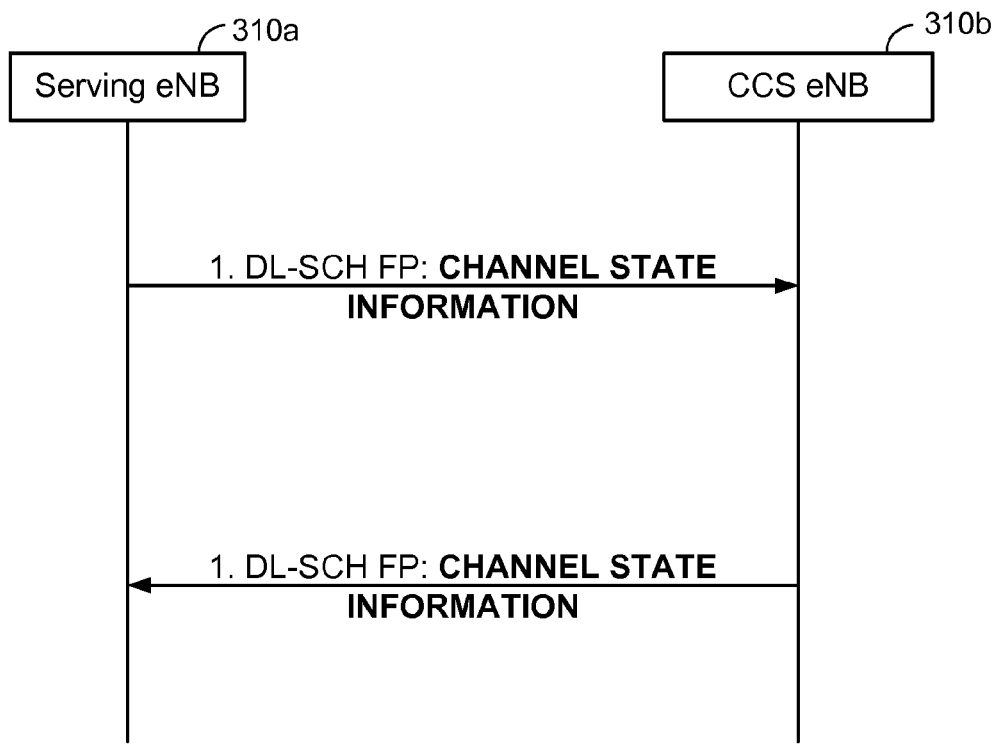
FIG. 28 illustrates an example Channel State Information procedure between a serving eNodeB and a CCS eNodeB.

An example Channel State Information procedure between a serving eNodeB 310*a* and a CCS eNodeB 310*b* is illustrated in FIG. 28. In this example, channel state information messages are exchanged between the eNodeB 310*a* and the eNodeB 310*b*. The Channel State Information message contains transmission matrix H information for one or more UEs in addition to scheduling information if couple mode is used. The UEs are identified by a unique ID allocated during the X2 DL CoMP Control Bearer Setup or Modify procedures.

Figure 29:
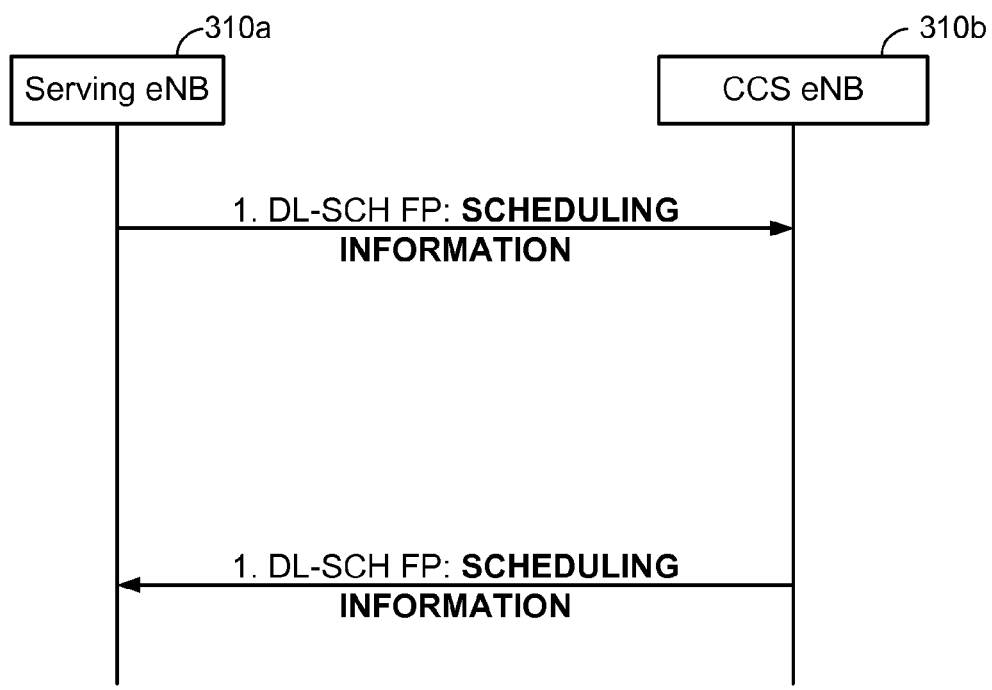
FIG. 29 illustrates an example Scheduling Information procedure between a serving eNodeB and a CCS eNodeB.

An example Scheduling Information procedure between a serving eNodeB 310*a* and a CCS eNodeB 310*b* is illustrated in FIG. 29. In this example, a scheduling information messages are exchanged between the eNodeB 310*a* and the eNodeB 310*b*. The Scheduling Information message contains scheduling information for one or more UEs if decoupled mode is used. The UEs are identified by a unique ID allocated during the X2 DL CoMP Control Bearer Setup or Modify procedure.

Figure 30:
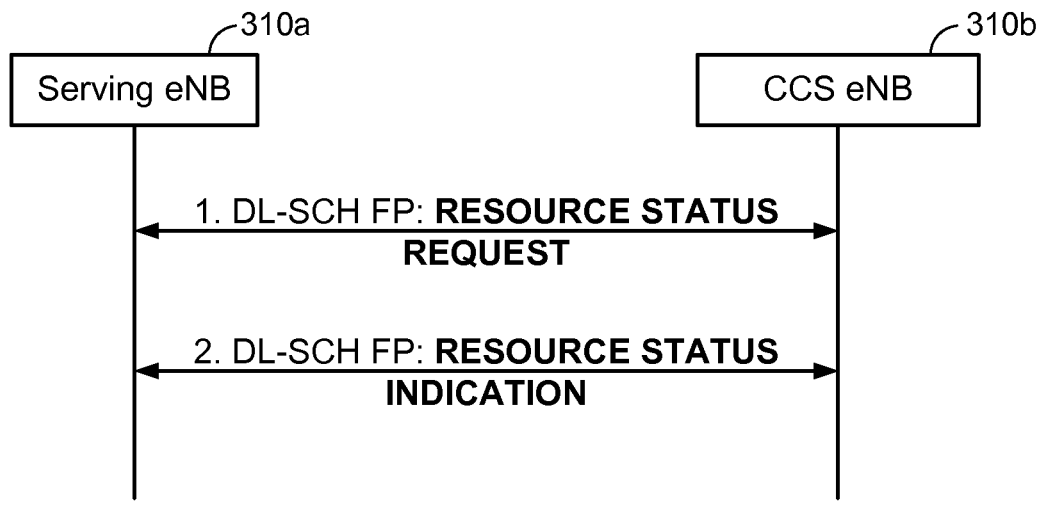
FIG. 30 illustrates an example Resource Status Request procedure and an example Resource Status Indication procedure between a serving eNodeB and a CCS eNodeB.
Figure 30:
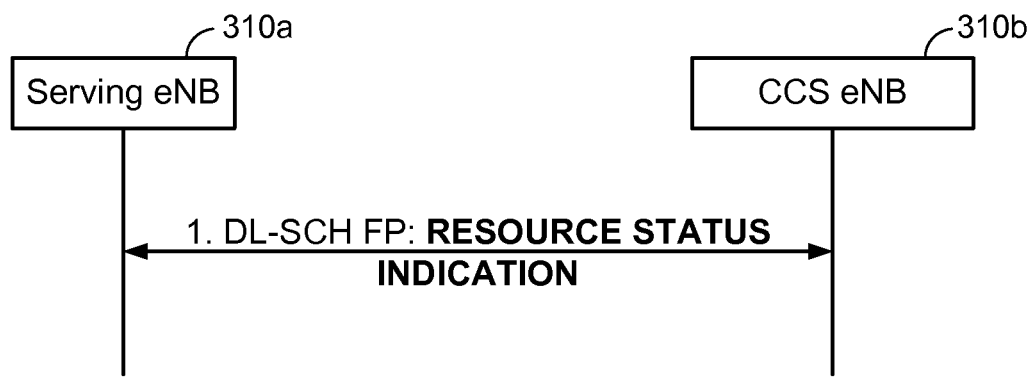

An example Resource Status Request procedure and an example Resource Status Indication procedure between a serving eNodeB 310*a* and a CCS eNodeB 310*b* are illustrated in FIG. 30. In one procedure, a Resource Status Request message is sent by a serving eNodeB 310*a* to the CCS eNodeB 310*b*, and in response, a Resource Status Indication message is returned from the CCS eNodeB 310*b* to the serving eNodeB 310*a*. In the other illustrated procedure of FIG. 30, a Resource Status Indication message is sent from the CCS eNodeB 310*b* to the serving eNodeB 310*a* without any initiating request. These messages can be used by the serving eNodeB and CCS eNodeB(s) in order to determine the delay on the X2 DL-CoMP-C and X2 DL-CoMP-U interfaces connecting them (e.g., if the DL-SCH FP control frames or DL-SCH FP data frames are arriving too late, then they are of no use to DL CoMP operation).

Figure 31:
FIG. 31 illustrates an example Data Transfer procedure between a serving eNodeB and a CCS eNodeB.

An example Data Transfer procedure between a serving eNodeB 310*a* and a CCS eNodeB 310*b* is illustrated in FIG. 31. A DL-SCH data frame message is sent by the serving eNodeB 310*a* to the CCS eNodeB 310*b* or vice versa (not shown) for user plane communications. This is applicable for DL CoMP DCS or JT.

Figure 32:
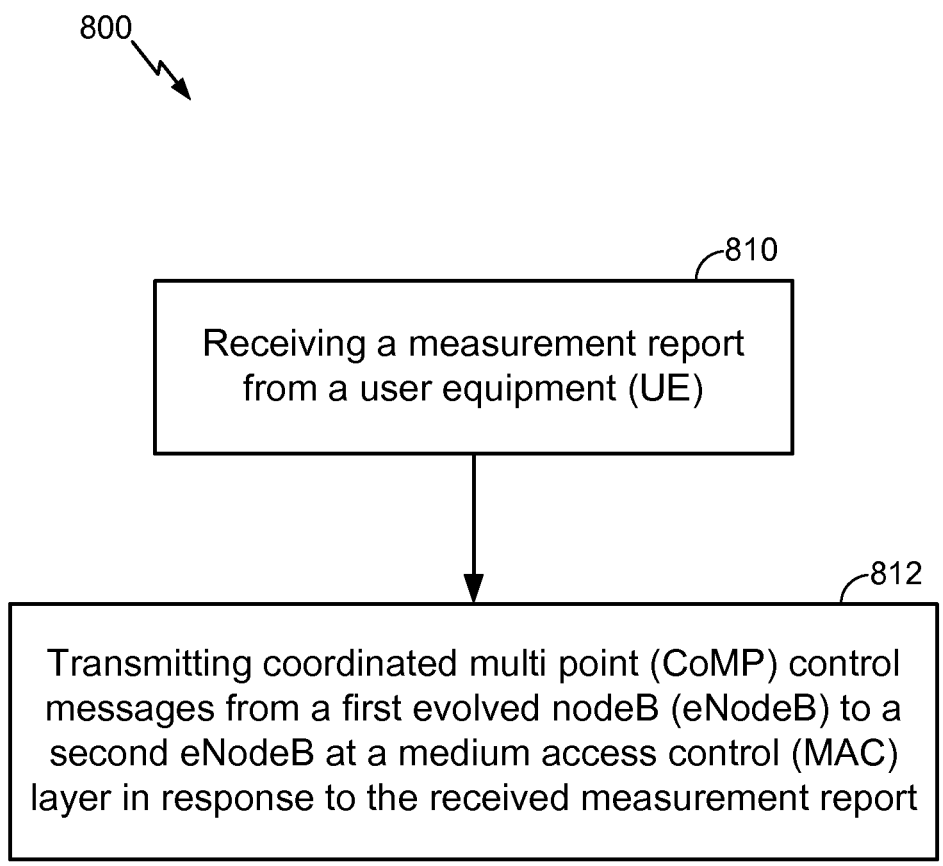
FIG. 32 is a block diagram illustrating a method of CoMP transmission.

FIG. 32 is an example block diagram illustrating a method of CoMP transmission In the example method 800, an eNodeB 310*a* receives a measurement report from a UE at block 810. Next, in block 812, the eNodeB transmits coordinated multi point (CoMP) control messages from a first evolved nodeB (eNodeB) 310*a* to a second eNodeB 310*b* at a medium access control (MAC) layer in response to the received measurement report.

In one configuration, the eNodeB 100 is configured for wireless communication including a means for receiving a measurement report. In one aspect, the receiving means may be the processor(s), the controller/processor 240, the memory 242, the receive processor 238, the MIMO detector 236, the demodulators 232A and 232T, and the antennas 234A and 234T, configured to perform the functions recited by the receiving means. The eNodeB 100 also includes a means for transmitting coordinated multipoint control messages from a first eNodeB to a second eNodeB at a MAC layer. In one aspect, the transmitting means may be the processor(s), the controller/processor 240, the memory 242, and the X2 interface 241 configured to perform the functions recited by the transmitting means. In another aspect, the aforementioned means may be a module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. For example, although the preceding description was with respect to downlink CoMP, the present disclosure is also applicable to uplink CoMP. Thus, the disclosure is not intended to be limited to the examples and designs described herein but is to be accorded the widest scope consistent with the principles and novel features disclosed herein.

What is claimed is:

1. A method of wireless communication, comprising:
   generating at a first evolved NodeB (eNodeB) a plurality of medium access control (MAC) layer protocol data units (PDUs) for retransmission by a second eNodeB to a user equipment (UE); and
   transmitting at least one coordinated multi point (CoMP) control message comprising the plurality of MAC layer PDUs over an X2 interface from the first eNodeB to the second eNodeB at the MAC layer for retransmission to the UE.

2. The method of claim 1, in which the at least one CoMP control message comprise a downlink shared channel (DL-SCH) message.

3. The method of claim 1, in which the at least one CoMP control message comprises at least one of a UE associated service message or a UE non-associated service message.

4. The method of claim 1, in which the at least one CoMP control message comprises at least one of channel state information, scheduling information, flow control information or beam forming information.

5. The method of claim 1, wherein the plurality of MAC layer PDUs further comprise CoMP data messages from the first eNodeB to the second eNodeB at the MAC layer.

6. The method of claim 1, further comprising transmitting at least one CoMP data message separate from the at least one CoMP control message from the first eNodeB to the second eNodeB, the at least one CoMP data message comprising a second plurality of MAC protocol data units (PDUs) for retransmission by the second eNodeB.

7. An apparatus of a wireless network, comprising:
   means for generating at a first evolved nodeB (eNodeB) a plurality of medium access control (MAC) layer protocol data units (PDUs) for retransmission by a second eNodeB to a user equipment (UE); and
   means for transmitting at least one coordinated multi point (CoMP) control message comprising the plurality of MAC layer PDUs over an X2 interface from the first eNodeB to the second eNodeB at the MAC layer for retransmission to the UE.

8. The apparatus of claim 7, in which the at least one CoMP control message comprises a downlink shared channel (DL-SCH) message.

9. The apparatus of claim 7, in which the at least one CoMP control message comprises at least one of a UE associated service message or a UE non-associated service message.

10. The apparatus of claim 7, in which the at least one CoMP control message comprises at least one of channel state information, scheduling information, flow control information or beam forming information.

11. The apparatus of claim 7, wherein the plurality of MAC layer PDUs further comprise CoMP data messages from the first eNodeB to the second eNodeB at the MAC layer.

12. The apparatus of claim 7, further comprising means for transmitting at least one CoMP data message separate from the at least one CoMP control message from the first eNodeB to the second eNodeB, the at least one CoMP data message comprising a second plurality of MAC protocol data units (PDUs) for retransmission by the second eNodeB.

13. A computer program product for wireless communications in a wireless network, comprising:
   a non-transitory computer-readable medium having program code recorded thereon, the program code comprising:
   program code to generate at a first evolved nodeB (eNodeB) a plurality of medium access control (MAC) layer protocol data units (PDUs) for retransmission by a second eNodeB to a user equipment (UE); and
   program code to transmit at least one coordinated multi point (CoMP) control message comprising the plurality of MAC layer PDUs over an X2 interface from the first eNodeB to the second eNodeB at the MAC layer for retransmission to the UE.

14. The computer program product of claim 13, in which the at least one CoMP control message comprises a downlink shared channel (DL-SCH) message.

15. The computer program product of claim 13 in which the at least one CoMP control message comprises at least one of a UE associated service message or a UE non-associated service message.

16. The computer program product of claim 13, in which the at least one CoMP control message comprises at least one of channel state information, scheduling information, flow control information or beam forming information.

17. The computer program product of claim 13, wherein the plurality of MAC layer PDUs further comprise CoMP data messages from the first eNodeB to the second eNodeB at the MAC layer.

18. The computer program product of claim 13, further comprising program code to transmit at least one CoMP data message separate from the at least one CoMP control message from the first eNodeB to the second eNodeB, the at least one CoMP data message comprising a second plurality of MAC protocol data units (PDUs) for retransmission by the second eNodeB.

19. An apparatus for wireless communication, comprising:
a memory; and
at least one processor coupled to the memory, the at least one processor being configured:
to generate at a first evolved nodeB (eNodeB) a plurality of medium access control (MAC) layer protocol data units (PDUs) for retransmission by a second eNodeB to a user equipment (UE); and
to transmit at least one coordinated multi point (CoMP) control message comprising the plurality of MAC layer PDUs over an X2 interface from the first eNodeB to the second eNodeB at the MAC layer for retransmission to the UE.

20. The apparatus of claim 19, in which the at least one CoMP control message comprises a downlink shared channel (DL-SCH) message.

21. The apparatus of claim 19, in which the at least one CoMP control message comprises at least one of a UE associated service message or a UE non-associated service message.

22. The apparatus of claim 19, in which the at least one CoMP control message comprises at least one of channel state information, scheduling information, flow control information or beam forming information.

23. The apparatus of claim 19, wherein the plurality of MAC layer PDUs further comprise CoMP data messages from the first eNodeB to the second eNodeB at the MAC layer.

24. The apparatus of claim 19, the processor further configured to transmit at least one CoMP data message separate from the at least one CoMP control message from the first eNodeB to the second eNodeB, the at least one CoMP data message comprising a second plurality of MAC protocol data units (PDUs).

* * * * *